US008917447B2

(12) United States Patent
Wolk et al.

(10) Patent No.: US 8,917,447 B2
(45) Date of Patent: Dec. 23, 2014

(54) MICROREPLICATED FILM FOR ATTACHMENT TO AUTOSTEREOSCOPIC DISPLAY COMPONENTS

(75) Inventors: Martin B. Wolk, Woodbury, MN (US); Michael J. Sykora, New Richmond, WI (US); William Blake Kolb, West Lakeland, MN (US); Encai Hao, Woodbury, MN (US); John C. Schultz, Afton, MN (US); Robert L. Brott, Woodbury, MN (US); William J. Bryan, Mahtomedi, MN (US); Scott M. Tapio, Falcon Heights, MN (US); Audrey A. Sherman, Saint Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 886 days.

(21) Appl. No.: 12/908,801

(22) Filed: Oct. 20, 2010

(65) Prior Publication Data
US 2011/0170184 A1    Jul. 14, 2011

Related U.S. Application Data

(60) Provisional application No. 61/294,577, filed on Jan. 13, 2010, provisional application No. 61/294,600, filed on Jan. 13, 2010, provisional application No. 61/294,610, filed on Jan. 13, 2010.

(51) Int. Cl.
G03B 21/60    (2014.01)
G02B 27/22    (2006.01)
F21V 8/00     (2006.01)

(52) U.S. Cl.
CPC .......... *G02B 27/2214* (2013.01); *G02B 6/0053* (2013.01); *G02B 6/0065* (2013.01)

USPC ......................................................... 359/452

(58) Field of Classification Search
USPC ......... 359/463, 475, 619, 640, 452, 455–457, 359/614; 362/620, 626; 349/95, 62–65, 96; 348/59
See application file for complete search history.

(56) References Cited

U.S. PATENT DOCUMENTS 2,801,185 A    7/1957  Iler
3,213,753 A    10/1965 Rogers
(Continued)

FOREIGN PATENT DOCUMENTS

JP    2005-266293    9/2005
WO    WO 2006/026743    3/2006
(Continued)

OTHER PUBLICATIONS

Lu et al., "Optimization of external coupling and light emission in organic light-emitting devices: modeling and experiment", J. Appl. Phys. 91 (Jan. 15, 2002), pp. 595-604).

(Continued)

*Primary Examiner* — Stephone B Allen
*Assistant Examiner* — Kimberly N Kakalec

(57) ABSTRACT

Microreplicated light redirecting films suitable for use in autostereoscopic displays and backlights are made to incorporate at least one nanovoided layer whose interface with another layer forms an embedded structured surface of the light redirecting film. The nanovoided layer includes a polymer binder and optional nanoparticles, and may have a refractive index less than 1.35 or 1.3. The light redirecting films may be adapted for attachment to one or more other components of an autostereoscopic display, such as a display panel and/or a light guide of a backlight.

23 Claims, 23 Drawing Sheets

(56) References Cited

U.S. PATENT DOCUMENTS

| | | | |
|---|---|---|---|
| 4,379,201 A | 4/1983 | Heilmann et al. | |
| 4,522,958 A | 6/1985 | Das et al. | |
| 4,737,559 A | 4/1988 | Kellen et al. | |
| 5,440,446 A | 8/1995 | Shaw et al. | |
| 5,592,332 A * | 1/1997 | Nishio et al. | 359/619 |
| 5,877,895 A | 3/1999 | Shaw et al. | |
| 6,010,751 A | 1/2000 | Shaw et al. | |
| 6,285,001 B1 | 9/2001 | Fleming et al. | |
| 7,018,713 B2 | 3/2006 | Padiyath et al. | |
| 7,094,122 B2 | 8/2006 | Toguchi et al. | |
| 7,098,590 B2 | 8/2006 | Lim et al. | |
| 7,122,845 B2 | 10/2006 | Uchida | |
| 7,165,959 B2 | 1/2007 | Humlicek et al. | |
| 7,210,836 B2 | 5/2007 | Sasagawa | |
| 7,224,529 B2 | 5/2007 | King et al. | |
| 7,247,394 B2 | 7/2007 | Hatwar et al. | |
| 7,547,476 B2 | 6/2009 | Jones et al. | |
| 7,589,461 B2 | 9/2009 | Park et al. | |
| 7,602,117 B2 | 10/2009 | Yamada et al. | |
| 7,924,368 B2 * | 4/2011 | Fabick et al. | 349/64 |
| 8,033,706 B1 * | 10/2011 | Kelly et al. | 362/607 |
| 2005/0024754 A1 * | 2/2005 | Epstein et al. | 359/831 |
| 2005/0052750 A1 | 3/2005 | King et al. | |
| 2005/0185279 A1 | 8/2005 | Mullen et al. | |
| 2005/0196552 A1 | 9/2005 | Lehmann | |
| 2006/0046046 A1 * | 3/2006 | Wang et al. | 428/315.7 |
| 2006/0164729 A1 * | 7/2006 | Wood | 359/619 |
| 2006/0219676 A1 | 10/2006 | Taylor et al. | |
| 2006/0291064 A1 * | 12/2006 | Yao et al. | 359/619 |
| 2007/0253058 A1 * | 11/2007 | Wood | 359/455 |
| 2008/0084519 A1 | 4/2008 | Brigham et al. | |
| 2008/0284945 A1 * | 11/2008 | Schultz et al. | 349/65 |
| 2009/0015142 A1 | 1/2009 | Potts et al. | |
| 2009/0015757 A1 | 1/2009 | Potts et al. | |
| 2009/0257324 A1 | 10/2009 | Seigler | |
| 2009/0273834 A1 | 11/2009 | Korenaga | |
| 2009/0316058 A1 | 12/2009 | Huizinga et al. | |
| 2010/0110551 A1 | 5/2010 | Lamansky et al. | |
| 2012/0287677 A1 * | 11/2012 | Wheatley et al. | 362/627 |

FOREIGN PATENT DOCUMENTS

| | | |
|---|---|---|
| WO | WO 2010/120422 | 10/2010 |
| WO | WO 2010/120468 | 10/2010 |
| WO | WO 2010/120845 | 10/2010 |
| WO | WO 2010/120864 | 10/2010 |
| WO | WO 2010/120871 | 10/2010 |
| WO | WO 2010/120971 | 10/2010 |
| WO | WO 2010/121019 | 10/2010 |
| WO | WO 2011/050233 | 4/2011 |

OTHER PUBLICATIONS

U.S. Appl. No. 12/643,503, "Optical Films Enabling Autostereoscopy", filed Dec. 21, 2009.

U.S. Appl. No. 61/359,634, "Lighting Assembly Having Viscoelastic Lightguide", filed Jun. 29, 2010.

U.S. Appl. No. 61/294,610, "Microstructured Low Refractive Index Viscoelastic Articles", filed Jan. 13, 2010.

U.S. Appl. No. 61/294,600, "Microstructured Low Refractive Index Articles", filed Jan. 13, 2010.

U.S. Appl. No. 61/294,577, "Microstructured Low Refractive Index Article Process", filed Jan. 13, 2010.

U.S. Appl. No. 61/303,152, "Optical Device Having Lightguide and Nanovoided Polymeric Layer", filed Feb. 10, 2010.

\* cited by examiner

US 8,917,447 B2

MICROREPLICATED FILM FOR ATTACHMENT TO AUTOSTEREOSCOPIC DISPLAY COMPONENTS

CROSS REFERENCE TO RELATED APPLICATIONS

This application claims the benefit of the following pending U.S. Provisional Applications, all of which were filed Jan. 13, 2010, and the disclosures of which are all incorporated herein by reference: 61/294,577, "Microstructured Low Refractive Index Article Process"; 61/294,600, "Microstructured Low Refractive Index Articles"; and 61/294,610, "Microstructured Low Refractive Index Viscoelastic Articles".

FIELD OF THE INVENTION

This invention relates generally to backlit displays, with particular application to such displays that present distinct left- and right-eye images to allow for stereoscopic viewing, and backlights therefor, and optical films and other components useable with such displays or backlights. The invention also relates to associated articles, systems, and methods.

BACKGROUND

A stereoscopic display usually presents an observer with images with parallax from individual right and left eye viewpoints. There are several techniques of providing the two eyes of the observer with the parallax images to produce a stereoscopic viewing experience. In a first technique, the observer utilizes a pair of shutter or 3-dimensional ("3D") glasses which transmit or block light from the viewer's eyes in synchronization with alternating the left/right image display. In a second technique, right eye and left eye images are alternatively displayed and directed towards the respective eyes of the observer but without the use of 3D glasses. This second technique is referred to as autostereoscopic, and is advantageous for 3D viewing because there is no need for the observer to wear any type of specialized glasses.

Autostereoscopic displays typically include a display panel, a specially designed backlight, and a specially designed light redirecting film disposed between the backlight and the display panel. The backlight provides a light guide having a light output area of nominally the same size as the display panel. Light sources disposed along opposite edges of the light guide are alternatively energized, causing the output area of the light guide to emit light alternatively at two different highly oblique angles. This light emitted by the light guide is intercepted by the light redirecting film (sometimes also referred to herein as 3D film), which converts the two different types of emitted light into alternating beams of light, one of which is directed to an observer's right eye and the other of which is directed to the observer's left eye. Placement of an electronically addressable display panel, such as an LCD panel, between the light redirecting film and the observer, and controlling the LCD panel to exhibit alternating right eye and left eye images in synchronization with the alternating light beams, allows the observer to perceive a 3-dimensional image.

The light redirecting film, which is typically cut to nominally the same size as the display panel and the output surface of the light guide, is held in place between the display panel and the light guide without actually being attached to either one. The resulting ability of the light redirecting film to move or shift in position subjects the film to potential warping and abrasion during the lifetime of the autostereoscopic display.

BRIEF SUMMARY

We have developed a new family of light redirecting films suitable for use in autostereoscopic displays and backlights, the light redirecting films incorporating at least one nanovoided layer whose interface with another layer forms an embedded structured surface of the light redirecting film. The nanovoided layer may have a very low refractive index at visible wavelengths, e.g., less than 1.35 or 1.3, or in a range from 1.15 to 1.35 or 1.15 to 1.3, for example. The disclosed light redirecting films may be adapted for attachment to one or more other components of an autostereoscopic display, e.g., a display panel and/or a light guide of a backlight. Attachment of the light redirecting film to these other components, some of which may be mechanically rigid or stiff, can in some cases help to alleviate problems associated with film movement or shifting. We also disclose such light directing films in combination with a display panel, a light guide, or both.

The present application therefore discloses, inter alia, light redirecting films that include a first major surface that is microstructured to form lenticular features, and a second major surface that is microstructured to form prismatic features. One of the first and second major surfaces is a first interface between a first high refractive index layer and a first low refractive index layer, and the first low refractive index layer has a first nanovoided morphology and comprises a first polymer binder.

In some cases, the first low refractive index layer may also include a first plurality of particles. In some cases, the first low refractive index layer may have a refractive index of 1.35 or less, or 1.3 or less, at a visible wavelength. In some cases, the first high refractive index layer may have a refractive index of at least 1.4 at a visible wavelength. In some cases, the film may also include a second high refractive index layer, and the second high refractive index layer may be disposed between the first and second major surfaces. In some cases, the second high refractive index layer may have physical characteristics making it suitable as a free-standing support film in roll-to-roll processing. In some cases, the film may contain no layer between the first and second major surfaces that has physical characteristics making it suitable as a free-standing support film in roll-to-roll processing. In some cases, each of the lenticular features may include a curved surface that is curved towards the second major surface. In some cases, each of the lenticular features may include a curved surface that is curved away from the second major surface. In some cases, the film is combined with a stiff support, and the film may be attached to the stiff support with no intervening air gap. In some cases, the stiff support may comprise a light transmissive plate.

In some cases, the first major surface may be the first interface. In some cases, the first high refractive index layer may be disposed between the first major surface and the second major surface. In some cases, the first low refractive index layer may be disposed between the first major surface and the second major surface. In some cases, the film may be combined with a display panel, the film being attached to the display panel with no intervening air gap. In some cases, the second major surface may be exposed to air. In some cases, the film may also include a second high refractive index layer, and a second low refractive index layer having a second nanovoided morphology and comprising a second polymer binder, and the second major surface may be a second interface between the second high refractive index layer and the second low refractive index layer. In some cases, the film may be combined with a light guide, the film being attached to the light guide with no intervening air gap. In some cases, the combination may further include a display panel, the film being attached to the display panel with no intervening air gap.

In some cases, the second major surface of the film may be the first interface. In some cases, the first high refractive index layer may be disposed between the first major surface and the second major surface. In some cases, the first low refractive index layer may be disposed between the first major surface and the second major surface. In some cases, the film may be combined with a light guide, the film being attached to the light guide with no intervening air gap. In some cases, the first major surface of the film may be exposed to air.

In some cases, the film may further include a first adhesive layer and a first release liner disposed on a first side of the film.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 21a is a viewing freedom diagram for the backlight of FIG. 20a;

In the figures, like reference numerals designate like elements.

DETAILED DESCRIPTION OF ILLUSTRATIVE EMBODIMENTS

Figure 1A:
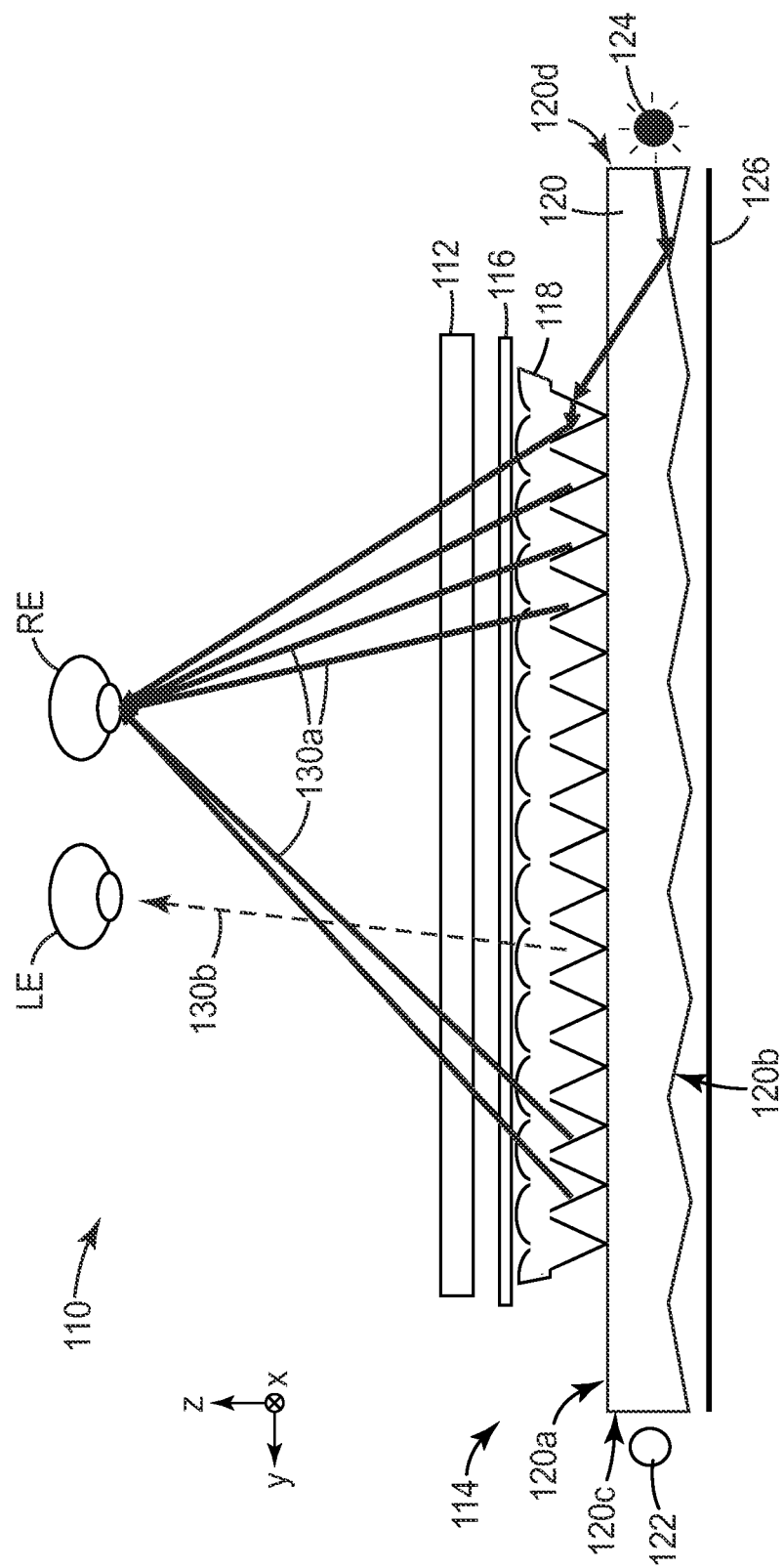
FIGS. 1a and 1b are schematic side views of a 3D autostereoscopic display device including a backlight, the display device capable of presenting different images to the right and left eyes.
Figure 1B:
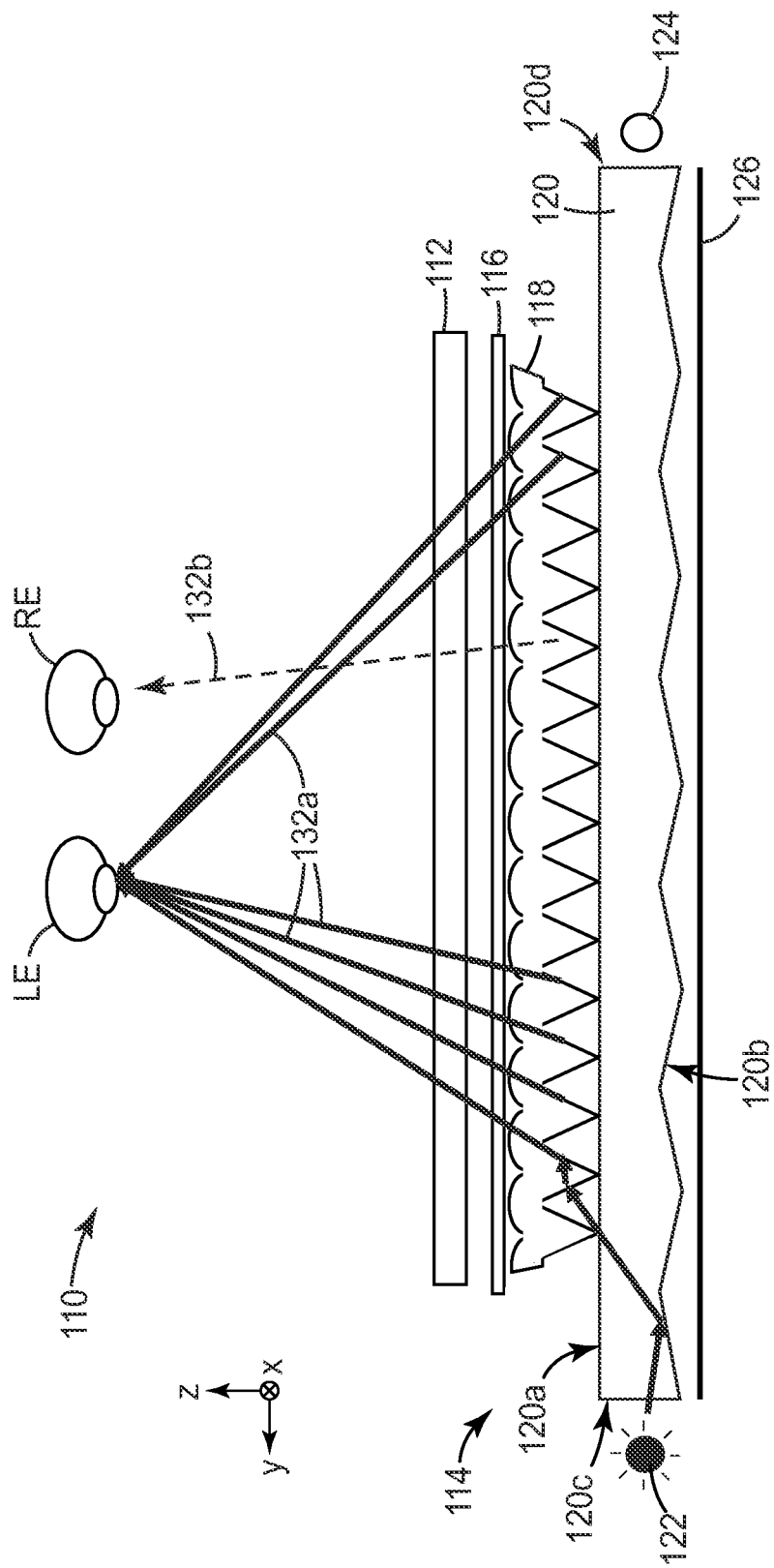

In FIGS. 1a and 1b, we see depicted some typical components of, as well as the basic operation of, a backlit autostereoscopic 3D display 110. In short, an observer having a left eye LE and a right eye RE views the display 110, and, by virtue of its construction and operation, perceives a 3-dimensional image. The display is depicted in the context of a Cartesian x-y-z coordinate system for ease of description, but the reader will understand that this does not limit the present disclosure to nominally planar displays, backlights, or light guides, for example.

The display 110 includes a liquid crystal panel 112 having individual pixels arranged in a matrix that defines an active or working area of the panel, the pixels being individually addressable by a controller (not shown). The controller sends control signals to the panel 112 to form any desired image, preferably in a colored or RGB (red-green-blue) sub-pixel format, in the active area of the panel 112. The display 110 is provided with a backlight, shown generally at 114, to make the image noticeable to the observer. The backlight 114 may be considered to include a polarizer 116, a 3D light redirecting film 118, a light guide 120, first and second light source assemblies 122, 124, respectively, and a back reflector 126. Some of these components, e.g. the back reflector 126 and/or the polarizer 116, may be omitted depending upon system requirements and design details, and other light management films or components, such as polarizing films (including reflective polarizing films), mirror films, diffusing films, multilayer optical films, window films, retarder films, prismatic brightness enhancement films, and other microstructured or non-microstructured films, may be added to the system as deemed appropriate by the system designer. Further, some components, such as the polarizer 116 and/or the redirecting film 118, may be considered to be part of the panel 112 rather than part of the backlight 114, or may be considered to be neither part of the backlight 114, nor part of the panel 112.

The light guide 120 is a key part of the backlight 114. The light guide has first and second major surfaces 120a, 120b, and first and second side surfaces 120c, 120d, as shown. The light guide receives light via the side surfaces 120c, 120d from the light source assemblies 122, 124, preferably in a sequential or alternating fashion, and causes the light from each of those assemblies to spread out, via multiple reflections, over an extended area of the light guide corresponding at least to a working area of the panel 112. As light from a given light source assembly traverses the length of the light guide, some of the light is extracted from the front or top surface (major surface 120a) of the light guide. This extracted light is typically highly oblique, e.g., peaking in luminance at about 70 degrees from the normal direction (z-axis) as measured in air, or having a peak luminance in a typical range from 50 to greater than 80 degrees, or from 60 to greater than 80 degrees. This highly oblique light is intercepted by the redirecting film 118, which is microstructured in such a way as to redirect the highly oblique light exiting the light guide 120 so that it is directed closer to the optical axis of the system, i.e., closer to the z-axis.

Due to the design of the light guide 120, light originating from the assembly 124 exits the surface 120a of the light guide at a highly oblique angle in a leftward-direction (closer to the +y direction) from the perspective of FIGS. 1a and 1b, while light originating from assembly 122 exits the surface 120a at a highly oblique angle in a rightward-direction (closer to the −y direction) from the same perspective. The redirecting film 118 is designed to redirect the oblique light originating from the assembly 124 in directions generally corresponding to light rays 130a, i.e., towards a right eye RE of the observer. The redirecting film 118 likewise redirects the oblique light originating from the assembly 122 in directions generally corresponding to light rays 132a, i.e., towards a left eye LE of the observer.

FIGS. 1a and 1b depict the display 110 at two different points in time. In FIG. 1a, light source assembly 124 is energized (turned "on") and light source assembly 122 is not (i.e. it is turned "off"), and in FIG. 1b, light source assembly 122 is energized and light source assembly 124 is not. The display is preferably controlled to alternate between these two illumination states. In synchrony with that alternating illumination, the controller causes the panel 112 to display a right-eye image when assembly 124 is energized, and a left-eye image when assembly 122 is energized. Rapid synchronous switching, e.g., switching frequencies of at least 90 Hz, or 100 Hz, or 110 Hz, or 120 Hz or more, between the right-eye image (and the assembly 124) and the left-eye image (and the assembly 122) allows the observer to perceive a stable 3D video image without requiring the observer to wear any special eyewear.

In the operation of the display 110, crosstalk occurs when light from the backlight reaches the left eye LE while the right-eye image is being displayed, and/or when light from the backlight reaches the right eye RE while the left-eye image is being displayed. Such crosstalk, which degrades the 3D viewing experience, is depicted by light ray 130b in FIG. 1a, and by light ray 132b in FIG. 1b.

Figure 2:
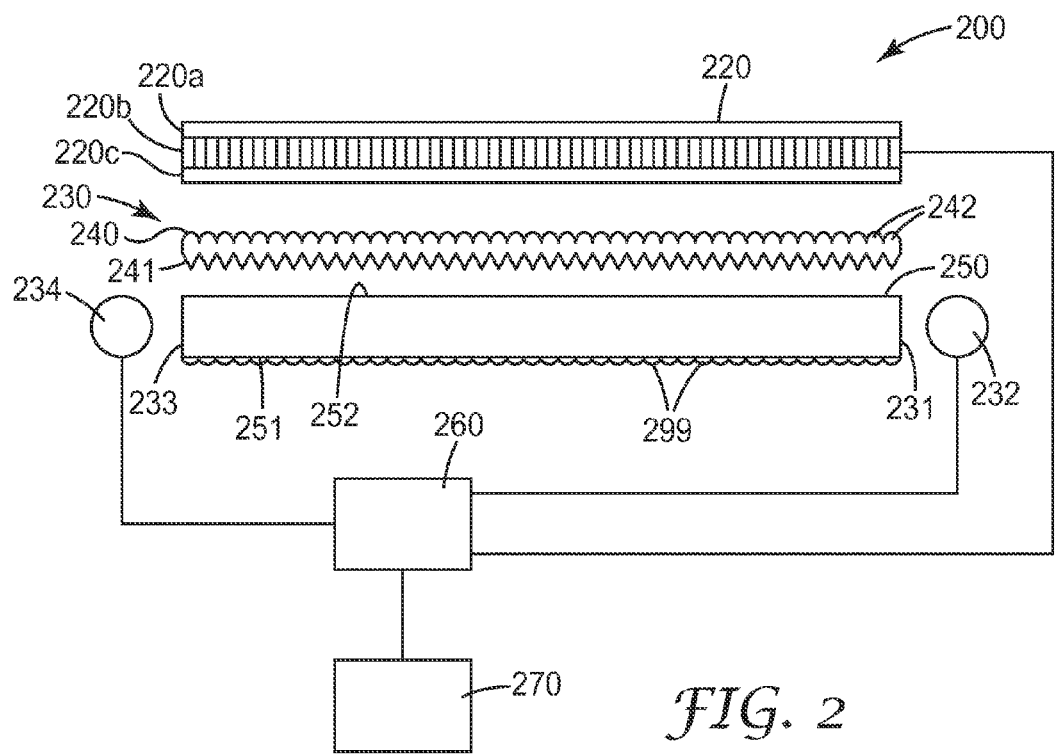
FIG. 2 is a schematic side view of an illustrative autostereoscopic display apparatus.

Exemplary light guides are composed of a suitable light-transmissive material such as a polymer or glass. The light guide may be relatively rigid or flexible, and it may be relatively thin (e.g. in the form of a film) or thick. The light guide may have a substantially rectangular shape in plan view as shown in the drawings, but non-rectangular shapes may also be used. A back or rear major surface (see surface 120b in FIGS. 1a and 1b) of the light guide is preferably shaped to include a plurality of extraction elements; features such as linear lenticular features, or linear prism features are useful. Each of the linear prisms may extend in a direction parallel to the side surfaces 120c, 120d, i.e., parallel to the x-axis shown in the figure. The linear prism features cause the back major surface (see surface 120b) to substantially redirect (e.g., reflect, extract, and the like) light, while the front major surface (see surface 120a) substantially transmits light. In some cases, a highly reflective surface on or adjacent the back major surface helps to redirect light out of the backlight through the front major surface. The front major surface may be substantially flat, but is preferably structured with light spreading elements such as lenticular, prismatic, or similar features that spread the light in the vertical direction, i.e., in the x-z plane of FIG. 2. Further design details regarding light guides suitable for use in autostereoscopic backlights can be found in U.S. Pat. No. 7,210,836 (Sasagawa et al.), and U.S. Patent Application Publication US 2009/0316058 (Huizing a et al.). Reference is also made to U.S. Patent Application Publication US 2008/0084519 (Brigham et al.). All three of these patent documents are incorporated herein by reference in their entireties.

Exemplary redirecting films have structured or faceted features on both major surfaces of the film. The front major surface, which faces the observer, may comprise linear lenticular features. The back major surface, which faces the light guide, may comprise linear prismatic features. The linear prismatic features are preferably parallel to each other, and parallel to the linear lenticular features on the front surface of the film. Moreover, the redirecting film is preferably oriented such that the linear lenticular and prismatic features of the redirecting film are parallel to the prismatic features on the back major surface of the light guide. The lenticular and prismatic features of the redirecting film are designed such that the highly oblique light emitted by the front major surface of the light guide is converted to more axially-directed light emitted at the proper angles such that an observer can perceive depth in the displayed image. Further design details of exemplary redirecting films can be found in one or more of the following documents: U.S. Pat. No. 7,210,836 (Sasagawa et al.), and U.S. Patent Application Publications US 2005/0052750 (King et al.), US 2008/0084519 (Brigham et al.), and US 2009/0316058 (Huizing a et al.), all of which are incorporated herein by reference in their entireties.

Another autostereoscopic display 200 is shown in FIG. 1A. The display 200 includes a display panel 220, e.g., a liquid crystal display (LCD) panel, and a backlight 230 positioned to provide light to the liquid crystal display panel 220. The display panel 220 is shown as including an interior pixelated layer 220b of liquid crystal material sandwiched between two panels or plates 220a, 220c. The backlight 230 includes one or more light guides 250, one or more right eye image light sources 232, e.g., solid state light sources, and one or more left eye image light sources 234, e.g., solid state light sources. Each of the first and second light sources 232, 234 is capable of repetitively transitioning between an OFF state, during which the light source 232, 234 produces no light output or a very small light output, and an ON state, during which the light source 232, 234 produces a significant light output, at a rate that is imperceptible to the human eye, for example, at a rate of at least 30 Hz per eye or preferably at least 60 Hz per eye.

The light sources 232, 234 may be inorganic solid state light sources, e.g., light emitting diodes (LEDs) or laser diodes, and/or may be organic light emitting diodes (OLEDs). Light extraction features 299, e.g., prisms, lenticular features, white dots, haze coatings and/or other features, may be disposed on one or both surfaces 251, 252 of the light guide 250. A double sided light redirecting optical film 240, as described in more detail herein, is disposed between the liquid crystal display panel 220 and the backlight 230. The double sided optical film 240 includes lenses 242 on the surface of the optical film 240 that is oriented away from the light guide 250. Each of the lenses 242 is registered to a corresponding prism 241 on the surface of the optical film 240 that is oriented toward the light guide 250. In general, dimensions for the pitch of the lenses and prisms may be determined, for example, by selecting a pitch that would result in the elimination or reduction of Moiré patterns in the display 200. The lens and prism pitches can also be determined based upon manufacturability. As LCD panels are manufactured with different pixel pitches, it can be desirable to change the pitch of the optical film to accommodate the different pixel pitches of the LCD panel. A useful pitch range for an autostereoscopic optical film 240 is about 10 microns to about 140 microns, for example.

The display 200 can have any useful shape or configuration. In many embodiments, the liquid crystal display panel 220 and/or light guide 250 have a square or rectangular shape. However, in some embodiments, the liquid crystal display panel 220 and/or the light guide 250 may have more than four sides and/or have a curved shape. The surfaces 251, 252 of the light guide 250 may be substantially parallel, or the light guide 250 may be wedge-shaped. In some cases, two wedge-shaped light guides with corresponding light sources may be used.

A synchronization driving element 260 is electrically connected to the right eye image and left eye image light sources 232, 234, and the liquid crystal display panel 220. The synchronization driving element 260 synchronizes activation and deactivation of the right eye image light source 232 and the left eye image light source 234 as image frames are provided to the liquid crystal display panel 220 to produce an image. The image may be a still image sequence, video stream, and/or rendered computer graphics, for example. An image source 270 is connected to the synchronization driving element 260 and provides the image frames (e.g., right eye images and left eye images) to the liquid crystal display panel 220.

The liquid crystal display panel 220 can be any useful transmissive liquid crystal display panel. In many embodiments, liquid crystal display panel 220 has a frame response time of less than 16 milliseconds, or less than 10 milliseconds, or less than 5 milliseconds, or less than 3 milliseconds. Commercially available transmissive liquid crystal display panels having an appropriate frame response time include, for example, the Toshiba Matsushita Display (TMD) optically compensated bend (OCB) mode panel LTA090A220F (Toshiba Matsushita Display Technology Co., Ltd., Japan).

The light guide 250 includes a first light input side 231 adjacent to the right eye image light source 232 and an opposing second light input side 233 adjacent to the left eye image light source 234. A first light guide surface 251 extends between the first side 231 and second side 233. A second light guide surface 252, opposite the first surface 251, extends between the first side 231 and the second side 233. Light may be reflected or emitted from either surface 251, 252 of the light guide 250, but in general light is emitted from surface 252 and is reflected from surface 251. In many embodiments, a highly reflective surface is on or adjacent to the first surface 251 to assist in re-directing light out through the second surface 252.

In some embodiments, the first light guide surface 251 includes a plurality of extraction elements 299 such as, prisms, lenticular features, white dots, haze coatings, and/or other features. The longitudinal axis of the extraction features can extend in a direction substantially parallel to the first side 231 and second side 233 or substantially parallel to the prisms and lenses of the double sided optical film 240, or the extraction features can be arranged at other angles.

The light sources 232, 234 can be any useful light source wherein the light output of each light source 232, 234 can be modulated from ON (relatively high light output) to OFF (no or negligible light output) at a rate of at least 30 Hz per eye or preferably 60 Hz or more per eye, for example. In many embodiments, the light sources 232, 234 are a plurality of LEDs, such as Nichia NSSW020B (Nichia Chemical Industries, Ltd., Japan). In some embodiments, the light sources 232, 234 comprise a plurality of laser diodes or OLEDs. The light sources 232, 234 can emit any number of visible light wavelengths such as red, blue, and/or green, or range or combinations of wavelengths to produce, for example, white light.

The light guide 250 can be a single layer of optically clear material with light sources adjacent both sides of the light guide 250, or two (or more) layers of optically clear material which preferentially extract light in a desired direction, with a light source for each layer.

The image source 270 can be any useful image source capable of providing images frames (e.g., right eye images and left eye images) such as, for example, a video source or a computer rendered graphic source. In many embodiments, the video source can provide image frames from 50 to 60 hertz or from 100 to 120 hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The image source 270 can provide video content. The image source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 260 can include any useful driving element providing synchronizing activation and deactivation (i.e., light output modulation) of the right eye image light source 232 and the left eye image light source 234 with image frames provided at a rate of, for example, 30 Hz or preferably 60 hertz or greater to the liquid crystal display panel 220 to produce video or rendered computer graphics. The synchronization driving element 260 can include a video interface such as, for example, a Westar VP-7 video adaptor (Westar Display Technologies, Inc., St. Charles, Mo.) coupled to custom light source drive electronics.

Figure 3:
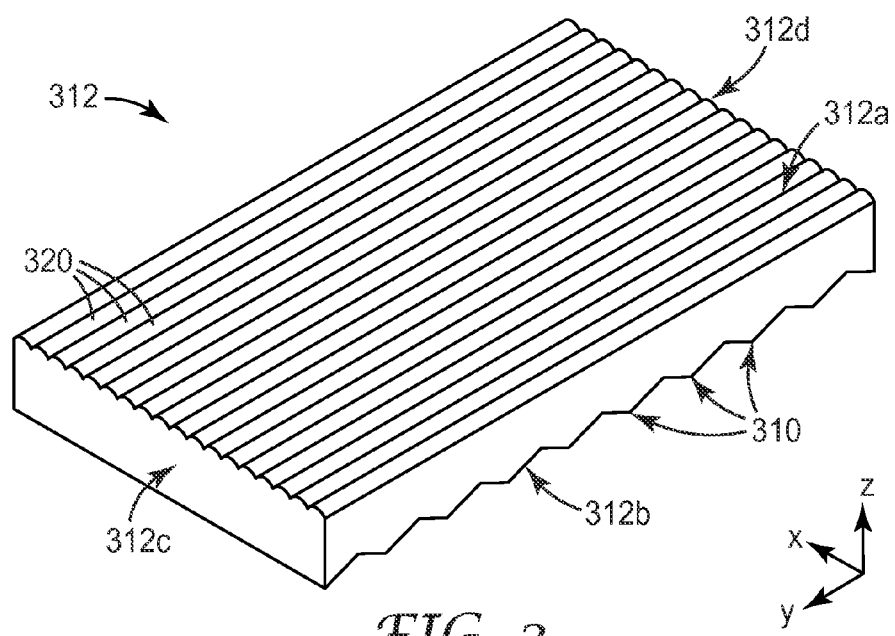
FIG. 3 is a schematic perspective view of a light guide, which view shows in exaggerated fashion exemplary surface structure on the two major surfaces of the light guide.
Figure 3A:
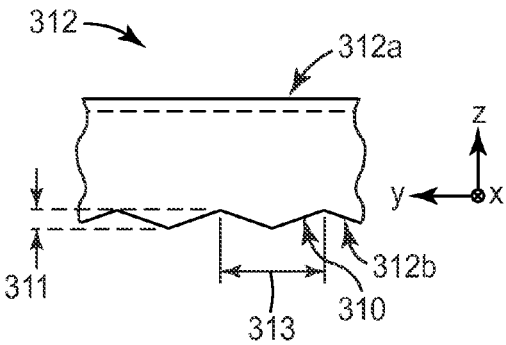
FIGS. 3a and 3b show schematic side views of the light guide of FIG. 3.
Figure 3B:
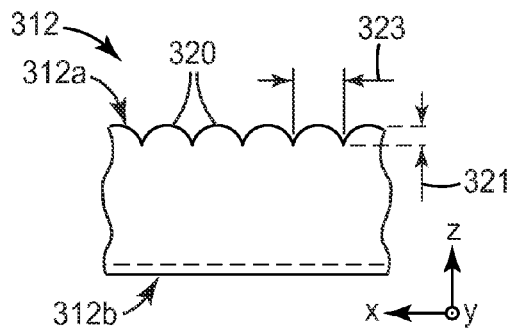

FIG. 3, shows a schematic perspective view of an exemplary light guide 312 suitable for use in the disclosed backlights, which view shows in exaggerated fashion exemplary surface structure on the two major surfaces of the light guide. Schematic side views of the light guide are shown in FIGS. 3a and 3b. The light guide 312 includes a first major surface 312a from which light is extracted towards a display panel and/or observer, a second major surface 312b opposite the first major surface, and side surfaces 312c, 312d which may serve as light injection surfaces for left-beam-emitting and right-beam-emitting partially collimated light sources as discussed elsewhere herein. For example, the light source assembly may be positioned along the side surface 312c to provide a left eye beam emitted from the light guide 312, and a similar assembly can be positioned along the side surface 312d to provide a right eye beam emitted from the light guide 312.

The rear major surface 312b of the light guide is preferably machined, molded, or otherwise formed to provide a linear array of prism structures 310 shown best in FIG. 3a. These prism structures are designed to reflect an appropriate portion of the light propagating along the length of the light guide so that the reflected light can refract out of the front major surface 312a into air (or into a low refractive index nano-voided material as discussed further below) and onward to the display panel and/or observer, with one or more intervening light management films such as prismatic light redirecting film, and so that such reflected light is extracted from the front major surface relatively uniformly along the length of the light guide. The surface 312b may be coated with a reflective film such as aluminum, or it may have no such reflective coating. In the absence of any such reflective coating, a separate back reflector may be provided proximate the surface 312b to reflect any downward-propagating light that passes through the light guide so that such light is reflected back into and through the light guide. Preferably, the prism structures have a depth 311 that is shallow relative to the overall thickness of the light guide, and a width 313 that is small relative to the length of the light guide. The light guide may be made of any transparent optical material, preferably with low scattering such as an acrylic polymer, e.g., Spartech Polycast material. In one exemplary embodiment, the light guide may be made of acrylic material, such as cell-cast acrylic, and may have an overall thickness of 1.4 mm and a length of 140 mm along the y-axis, and the prisms may have a depth 311 of 2.9 micrometers and a width 313 of 81.6 micrometers, corresponding to a prism apex angle of about 172 degrees.

The front major surface 312a of the light guide is preferably machined, molded, or otherwise formed to provide a linear array of lenticular structures 320 that are parallel to each other and to a second axis (e.g. the y-axis) different from a first axis (e.g. the x-axis) along which the prism structures 310 extend. The lenticular structures may be shaped and oriented to enhance angular spreading along the x-axis for light that passes out of the light guide through the front major surface, and, if desired, to limit spatial spreading along the x-axis for light that remains in the light guide by reflection from the front major surface. In some cases, the lenticular structures 320 may have a depth 321 that is shallow relative to the overall thickness of the light guide, and a width 323 that is small relative to the width of the light guide. In some cases, the lenticular structures may be relatively strongly curved, as shown in FIG. 3b, while in other cases they may be more weakly curved. In one embodiment, the light guide may be made of cell-cast acrylic and may have an overall thickness of 0.76 mm, a length of 141 mm along the y-axis, and a width of 66 mm along the x-axis, and the lenticular structures 320 may have a radius of 35.6 micrometers, a depth 321 of 32.8 micrometers, and a width 323 of 72.6 mm, for example. In this embodiment, the prism structures 310 may have a depth 311 of 2.9 micrometers, a width 313 of 81.6 micrometers, and a prism apex angle of about 172 degrees.

Figure 4A:
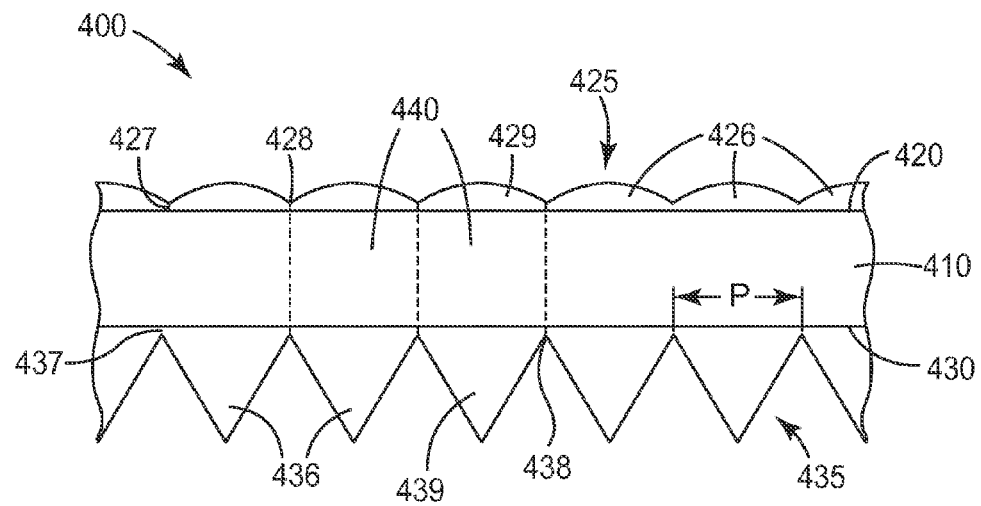
FIG. 4a is a schematic cross-sectional view of a light redirecting film.

In FIG. 4a, an exemplary 3D light redirecting film 400 for use in autostereoscopic display systems is shown. The film 400 includes a web 410 substrate having opposed first and second surfaces 420, 430. First and second surfaces 420, 430 include first and second microreplicated structures 425, 435, respectively. First microreplicated structure 425 includes a plurality of arcuate features 426, which in the embodiment shown are cylindrical lenses with an effective diameter of about 142 microns, although other diameters may also be used. Second microreplicated structure 435 includes a plurality of saw-tooth or pyramidal prismatic features 436.

In the depicted example, first and second features 426, 436 have the same pitch or period of repetition P, e.g., the period of the first feature may be about 150 microns, and the period of repetition of the second feature may be the same. Typically, the ratio of the period of the first and second features is a whole number ratio (or the inverse), though other combinations are permissible. The features shown are of indefinite length in a down-web direction.

In the depicted example, opposed microreplicated features 426, 436 cooperate to form a plurality of lens features 440. In the example embodiment shown, the lens features 440 are lenticular lenses. Since the performance of each lens feature 440 is a function of the alignment of the opposed features 429, 439 forming each lens, precision alignment or registration of the lens features may be preferred.

Optionally, the film 400 may also include first and second land areas 427, 437. The land area is defined as the material between the substrate surfaces 420, 430 and the bottom of each respective feature, i.e., valleys 428, 438. The first land area 428 may be at least about 10 microns on the lens side and the second land area 438 may be about at least about 25 microns on the prism side. The land area assists in the features having good adherence to the web and also aid in replication fidelity.

The film 400 may be made using an apparatus and method for producing precisely aligned microreplicated structures on opposed surfaces of the web, the apparatus and methods which are described in detail in U.S. Pat. No. 7,224,529 (King et al.). One embodiment of the film 400 was made using the using a web made from polyethylene terephthalate (PET), 0.0049 inches thick. Other web materials can also be used, e.g., polycarbonate.

Figure 4B:
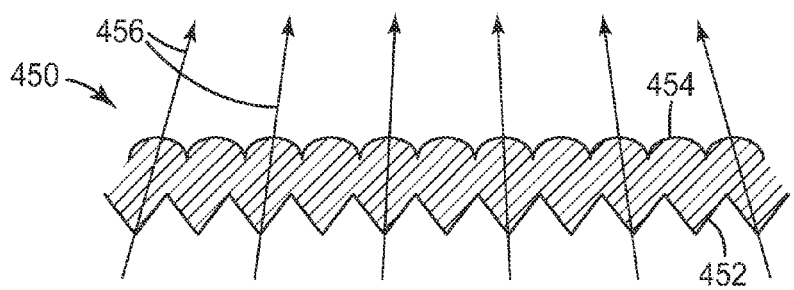
FIG. 4b is a schematic cross-sectional view of another light redirecting film.

In FIG. 4b, another 3D light redirecting film 450 suitable for use in autostereoscopic display systems is shown. A group of cylindrical lenses 454 is formed on one side of the film 450, and a group of triangular-like prisms 452 is formed on the other side. In this embodiment, the center-to-center spacing or pitch of the prisms 452 is deliberately made to be greater than the pitch of the cylindrical lenses, such that center lines 456 drawn from the apex of each prism to a core of each corresponding cylindrical lens gather or intersect at a specified region of space above the film 450. For example, the specified region may be a region 20 to 100 cm above or of front of the center section of the film 450 or associated display. Further details of light redirecting films as depicted in FIG. 4a can be found in Japanese Publication JP 2005-266293 (Akimasa et al.)

Still other 3D light redirecting film designs are described in commonly assigned U.S. patent application Ser. No. 12/643, 503, "Optical Films Enabling Autostereoscopy", filed Dec. 21, 2009 and incorporated herein by reference in its entirety. This application discloses, among other things, double-sided optical films that include a-cylindrical lenses disposed on a first surface of the optical film, and prisms disposed on a second surface of the optical film, wherein each lens on the first surface is registered to a prism on the second surface. The application also discloses double-sided optical films that include lenses disposed on a first surface of the optical film, and prisms disposed on a second surface of the optical film, wherein a rotation of the lenses on the first surface varies with position on the first surface and each lens on the first surface is registered to a prism on the second surface.

Exemplary 3D light redirecting films disclosed herein incorporate at least one nanovoided layer. The nanovoided layer may include a plurality of interconnected voids or a network of voids dispersed in a binder. At least some of the voids in the plurality or network are connected to one another via hollow tunnels or hollow tunnel-like passages. The voids preferably occupy a sufficiently large fraction of the volume of the layer, but are individually of a small enough size, so that the nanovoided layer behaves optically like a material of very low refractive index, e.g., less than 1.35 or less than 1.3. Such a layer is particularly advantageous for use in an light redirecting films as demonstrated more fully below. In some cases, the nanovoided layer may exhibit a refractive index in a range from 1.15 to 1.35, or from 1.15 to 1.3, for example. The nanovoided layer preferably has at least one major surface that is microstructured, i.e., deliberately tailored to have a non-smooth or non-flat surface with relief features that have at least one dimension that is less than 1 millimeter, and in some cases the at least one dimension may be in a range from 50 nanometers to 500 micrometers.

Figure 5:
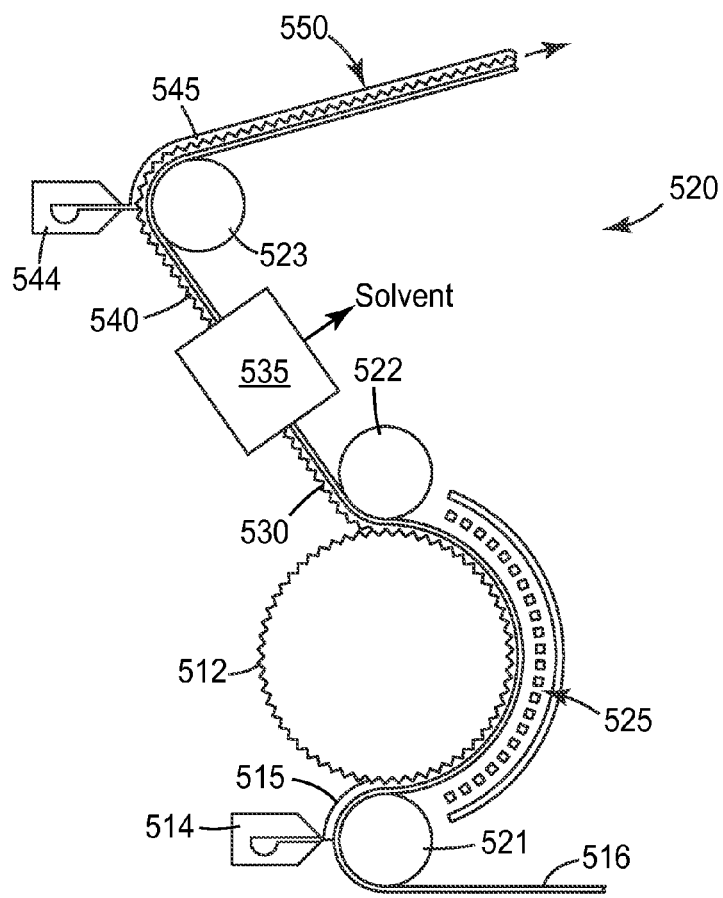
FIG. 5 is a schematic diagram of an illustrative process of forming a backfilled nanovoided microstructured article.
Figure 6:
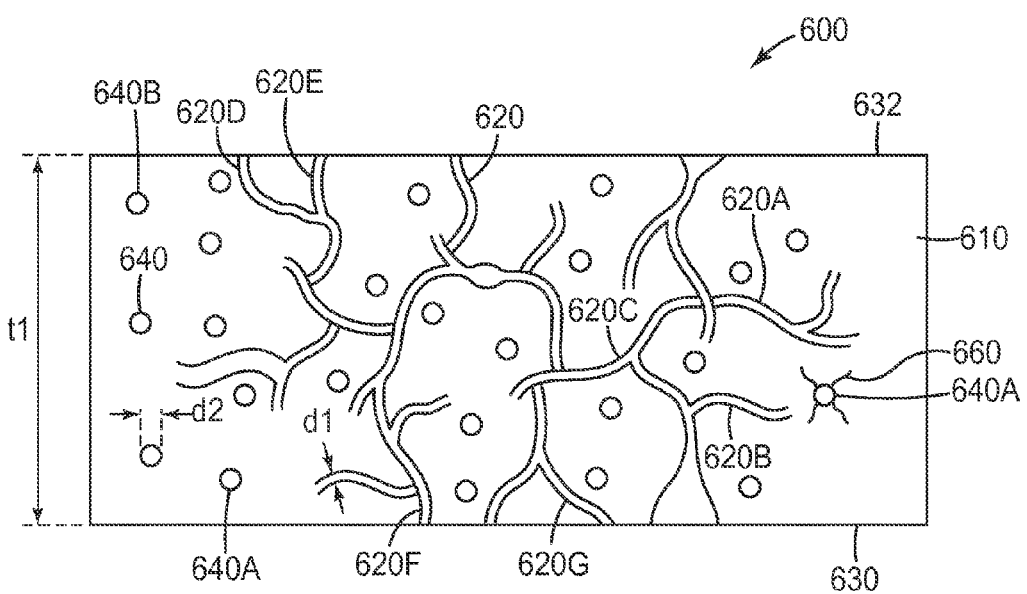
FIG. 6 is a schematic side elevational view of a portion of a nanovoided microstructured layer.

In connection with FIGS. 5 and 6, we describe exemplary methods of fabricating a nanovoided layer, as well as features and characteristics that such layers may exhibit. Further details regarding suitable nanovoided layers and their manufacture can be found in commonly assigned U.S. patent application Ser. No. 61/405,128 entitled "Optical Films With Microstructured Low Refractive Index Nanovoided Layers and Methods Therefor", filed on even date herewith.

Turning first to FIG. 5, we see there an exemplary process 520 of forming a backfilled nanovoided microstructured article 550, and a corresponding system for manufacturing such articles. The process 520 includes disposing a coating solution 515 onto a substrate 516. The substrate 516 is preferably a flexible film made of a polymer and/or other suitable material, the film having a thickness, composition, and other physical characteristics that make it suitable for use as a free-standing support film or carrier film in roll-to-roll processing systems such as that depicted in FIG. 5. Typically, such a substrate or carrier film, if made with a conventional light-transmissive polymer material, has a physical thickness of at least 0.002 inches (about 50 micrometers) in order to have sufficient strength to be unwound, processed in the roll-to-roll processing system, and wound up again or subjected to one or more converting operations (such as slitting or singulating into individual sheets or pieces) without excessive unintended stretching, curling, or warping.

In some cases the coating solution 515 may be applied using a die 514 such as a slot coater die for example. The coating solution 515 includes a polymerizable material and a solvent. Then the process 520 includes polymerizing the polymerizable material while the coating solution 515 is in contact with a microreplication tool 512 to form a microstructured layer 530. Solvent is then removed, for example by an oven 535, from the microstructured layer 530 to form a nanovoided microstructured article 540. Then the process 520 includes disposing a polymeric material 545 on the nanovoided microstructured article 540 to form a backfilled nanovoided microstructured article 550. The polymeric material 545 may be applied using a die 544 such as a slot coater die for example, or by other suitable means. The polymeric material 545 may alternatively be laminated onto the nanovoided microstructured article 540 to form the nanovoided microstructured article 550.

The microreplication tool 512 can be any useful microreplication tool. The microreplication tool 512 is illustrated as a roll where the microreplication surface is on the exterior of the roll. It is also contemplated that the microreplication apparatus can include a smooth roll where the microreplication tool is a structured surface of the substrate 516 that contacts the coating solution 515. The illustrated microreplication tool 512 includes a nip roll 521 and a take-away roll 522. A curing source 525, such as a bank of UV lights, is illustrated as being directed toward the substrate 516 and coating solution 515 while the coating solution 515 is in contact with the microreplication tool 512 to form a microstructured layer 530. In some embodiments, the substrate 516 can transmit the curing light to the coating solution 515 to cure the coating solution 515 and form the microstructured layer 530. In other embodiments the curing source 525 is a heat source and the coating solution 515 includes a thermal curing material. The curing source 525 can be disposed either as illustrated or within the microreplication tool 512. When the curing source 525 is disposed within the microreplication tool 512, the microreplication tool 512 can transmit light to the coating solution 515 to cure the coating solution 515 and form the microstructured layer 530.

The processes to form the nanovoided microstructured articles can include additional processing steps such as post-cure or further polymerization steps, for example. In some cases, a post-cure step is applied to the nanovoided microstructured article following the solvent removal step. In some embodiments, these processes can include additional processing equipment common to the production of web-based materials, including, for example, idler rolls, tensioning rolls, steering mechanisms, surface treaters such as corona or flame treaters, lamination rolls, and the like. In some cases, these processes can utilize different web paths, coating techniques, polymerization apparatus, positioning of polymerization apparatus, drying ovens, conditioning sections, and the like, and some of the sections described can be optional. In some cases, one, some, or all steps of the process can be carried out as a "roll-to-roll" process wherein at least one roll of substrate is passed through a substantially continuous process and ends up on another roll or is converted via sheeting, laminating, slitting, or the like.

Turning now to FIG. 6, we see there a schematic elevational view of a portion of a nanovoided microstructured layer 600. Although the nanovoided microstructured layer 600 is illustrated having two planar outer surfaces 630, 632, it is understood that at least one of the outer surfaces 630, 632 is microstructured to form features that are suitable for use in 3D light redirecting films as discussed elsewhere herein.

Exemplary nanovoided microstructured layers 600 include a plurality of interconnected voids or a network of voids 620 dispersed in a binder 610. At least some of the voids in the plurality or network are connected to one another via hollow tunnels or hollow tunnel-like passages. The interconnected voids may be the remnant of an interconnected mass of solvent that formed part of the originally coated film, and that was driven out of the film by the oven or other means after curing of the polymerizable material. The network of voids 620 can be regarded to include interconnected voids or pores 620A-620C as shown in FIG. 6. The voids are not necessarily free of all matter and/or particulates. For example, in some cases, a void may include one or more small fiber- or string-like objects that include, for example, a binder and/or nanoparticles. Some disclosed nanovoided microstructured layers include multiple sets of interconnected voids or multiple networks of voids where the voids in each set or network are interconnected. In some cases, in addition to multiple pluralities or sets of interconnected voids, the nanovoided microstructured layer may also include a plurality of closed or unconnected voids, meaning that the voids are not connected to other voids via tunnels. In cases where a network of voids 620 forms one or more passages that extend from a first major surface 630 to an opposed second major surface 632 of the nanovoided layer 600, the layer 600 may be described as being a porous layer.

Some of the voids can reside at or interrupt a surface of the nanovoided microstructured layer and can be considered to be surface voids. For example, in the exemplary nanovoided microstructured layer 600, voids 620D and 620E reside at second major surface 632 of the nanovoided microstructured layer and can be regarded as surface voids 620D and 620E, and voids 620F and 620G reside at first major surface 630 of the nanovoided microstructured layer and can be regarded as surface voids 620F and 620G. Some of the voids, such as voids 620B and 620C, are disposed within the interior of the optical film and away from the exterior surfaces of the optical film, and can thus be regarded as interior voids 620B and 620C even though an interior void may be connected to a major surface via one or more other voids.

Voids 620 have a size d1 that can generally be controlled by choosing suitable composition and fabrication, such as coating, drying, and curing conditions. In general, d1 can be any desired value in any desired range of values. For example, in some cases, at least a majority of the voids, such as at least 60% or 70% or 80% or 90% or 95% of the voids, have a size that is in a desired range. For example, in some cases, at least a majority of the voids, such as at least 60% or 70% or 80% or 90% or 95% of the voids, have a size that is not greater than about 10 micrometers, or not greater than about 7, or 5, or 4, or 3, or 2, or 1, or 0.7, or 0.5 micrometers.

In some cases, a plurality of interconnected voids 620 has an average void or pore size that is not greater than about 5 micrometers, or not greater than about 4 micrometers, or not greater than about 3 micrometers, or not greater than about 2 micrometers, or not greater than about 1 micrometer, or not greater than about 0.7 micrometers, or not greater than about 0.5 micrometers.

In some cases, some of the voids can be sufficiently small so that their primary optical effect is to reduce the effective refractive index, while some other voids can reduce the effective index and scatter light, while still some other voids can be sufficiently large so that their primary optical effect is to scatter light.

The nanovoided microstructured layer 600 may have any useful thickness t1 (linear distance between first major surface 630 and second major surface 632). In many embodiments the nanovoided microstructured layer may have a thickness t1 that is not less than about 100 nm, or not less than about 500 nm, or not less than about 1,000 nm, or in a range from 0.1 to 10 micrometers, or in a range from 1 to 100 micrometers.

In some cases, the nanovoided microstructured layer may be thick enough so that the nanovoided microstructured layer can reasonably have an effective refractive index that can be expressed in terms of the indices of refraction of the voids and the binder, and the void or pore volume fraction or porosity. In such cases, the thickness of the nanovoided microstructured layer is not less than about 500 nm, or not less than about 1,000 nm, or in a range from 1 to 10 micrometers, or in a range from 500 nm to 100 micrometers, for example.

When the voids in a disclosed nanovoided microstructured layer are sufficiently small and the nanovoided microstructured layer is sufficiently thick, the nanovoided microstructured layer has an effective permittivity $\epsilon_{\mathit{eff}}$ that can be expressed as:

$$\epsilon_{\mathit{eff}} = (f)\epsilon_v + (1-f)\epsilon_b, \qquad (1)$$

where $\epsilon_v$ and $\epsilon_b$ are the permittivities of the voids and the binder respectively, and f is the volume fraction of the voids in the nanovoided microstructured layer. In such cases, the effective refractive index $n_{\mathit{eff}}$ of the nanovoided microstructured layer can be expressed as:

$$n_{\mathit{eff}}^2 = (f)n_v^2 + (1-f)n_b^2, \qquad (2)$$

where $n_v$ and $n_b$ are the refractive indices of the voids and the binder respectively. In some cases, such as when the difference between the indices of refraction of the voids and the binder is sufficiently small, the effective index of the nanovoided microstructured layer can be approximated by the following expression:

$$n_{\mathit{eff}} \approx (f)n_v + (1-f)n_b, \qquad (3)$$

In such cases, the effective index of the nanovoided microstructured layer is the volume weighted average of the indices of refraction of the voids and the binder. For example, a nanovoided microstructured layer that has a void volume fraction of 50% and a binder that has an index of refraction of 1.5 has an effective index of about 1.25 as calculated by equation (3), and an effective index of about 1.27 as calculated by the more precise equation (2). In some exemplary embodiments the nanovoided microstructured layer may have an effective refractive index in a range from 1.15 to 1.35, or from 1.15 to 1.3, but values outside these ranges are also contemplated.

The nanovoided layer 600 of FIG. 6 is also shown to include, in addition to the plurality of interconnected voids or network of voids 620 dispersed in the binder 610, an optional plurality of nanoparticles 640 dispersed substantially uniformly within the binder 610.

Nanoparticles 640 have a size d2 that can be any desired value in any desired range of values. For example, in some cases at least a majority of the particles, such as at least 60% or 70% or 80% or 90% or 95% of the particles, have a size that is in a desired range. For example, in some cases, at least a majority of the particles, such as at least 60% or 70% or 80% or 90% or 95% of the particles, have a size that is not greater than about 1 micrometer, or not greater than about 700, or 500, or 200, or 100, or 50 nanometers. In some cases, the plurality of nanoparticles 640 may have an average particle size that is not greater than about 1 micrometer, or not greater than about 700, or 500, or 200, or 100, or 50 nanometers.

In some cases, some of the nanoparticles can be sufficiently small so that they primarily affect the effective refractive index, while some other nanoparticles can affect the effective index and scatter light, while still some other particles can be sufficiently large so that their primary optical effect is to scatter light.

The nanoparticles 640 may or may not be functionalized. In some cases, some, most, or substantially all of the nanoparticles 640, such as nanoparticle 640B, are not functionalized. In some cases, some, most, or substantially all of the nanoparticles 640 are functionalized or surface treated so that they can be dispersed in a desired solvent or binder 610 with no, or very little, clumping. In some embodiments, nanoparticles 640 can be further functionalized to chemically bond to binder 610. For example, nanoparticles such as nanoparticle 640A, can be surface modified or surface treated to have reactive functionalities or groups 660 to chemically bond to binder 610. Nanoparticles can be functionalized with multiple chemistries, as desired. In such cases, at least a significant fraction of nanoparticles 640A are chemically bound to the binder. In some cases, nanoparticles 640 do not have reactive functionalities to chemically bond to binder 610. In such cases, nanoparticles 640 can be physically bound to binder 610.

In some cases, some of the nanoparticles have reactive groups and others do not have reactive groups. An ensemble of nanoparticles can include a mixture of sizes, reactive and nonreactive particles, and different types of particles (e.g., silica and zirconium oxide). In some cases, the nanoparticles may include surface treated silica nanoparticles.

The nanoparticles may be inorganic nanoparticles, organic (e.g., polymeric) nanoparticles, or a combination of organic and inorganic nanoparticles. Furthermore, the nanoparticles may be porous particles, hollow particles, solid particles, or combinations thereof. Examples of suitable inorganic nanoparticles include silica and metal oxide nanoparticles including zirconia, titania, ceria, alumina, iron oxide, vanadia, antimony oxide, tin oxide, alumina/silica, and combinations thereof. The nanoparticles can have an average particle diameter less than about 1000 nm, or less than about 100 or 50 nm, or the average may be in a range from about 3 to 50 nm, or from about 3 to 35 nm, or from about 5 to 25 nm. If the nanoparticles are aggregated, the maximum cross sectional dimension of the aggregated particle can be within any of these ranges, and can also be greater than about 100 nm. In some embodiments, "fumed" nanoparticles, such as silica and alumina, with primary size less than about 50 nm, are also included, such as CAB-O-SPERSE® PG 002 fumed silica, CAB-O-SPERSE® 2017A fumed silica, and CAB-O-SPERSE® PG 003 fumed alumina, available from Cabot Co. Boston, Mass.

The nanoparticles may include surface groups selected from the group consisting of hydrophobic groups, hydrophilic groups, and combinations thereof. Alternatively, the nanoparticles may include surface groups derived from an agent selected from the group consisting of a silane, organic acid, organic base, and combinations thereof. In other embodiments, the nanoparticles include organosilyl surface groups derived from an agent selected from the group consisting of alkylsilane, arylsilane, alkoxysilane, and combinations thereof.

The term "surface-modified nanoparticle" refers to a particle that includes surface groups attached to the surface of the particle. The surface groups modify the character of the particle. The terms "particle diameter" and "particle size" refer to the maximum cross-sectional dimension of a particle. If the particle is present in the form of an aggregate, the terms "particle diameter" and "particle size" refer to the maximum cross-sectional dimension of the aggregate. In some cases, particles can be large aspect ratio aggregates of nanoparticles, such as fumed silica particles.

The surface-modified nanoparticles have surface groups that modify the solubility characteristics of the nanoparticles. The surface groups are generally selected to render the particle compatible with the coating solution. In one embodiment, the surface groups can be selected to associate or react with at least one component of the coating solution, to become a chemically bound part of the polymerized network.

A variety of methods are available for modifying the surface of nanoparticles including, e.g., adding a surface modifying agent to nanoparticles (e.g., in the form of a powder or a colloidal dispersion) and allowing the surface modifying agent to react with the nanoparticles. Other useful surface modification processes are described in, e.g., U.S. Pat. No. 2,801,185 (Iler) and U.S. Pat. No. 4,522,958 (Das et al.).

The nanoparticles may be provided in the form of a colloidal dispersion. Examples of useful commercially available unmodified silica starting materials include nano-sized colloidal silicas available under the product designations NALCO 1040, 1050, 1060, 2326, 2327, and 2329 colloidal silica from Nalco Chemical Co., Naperville, Ill.; the organosilica under the product name IPA-ST-MS, IPA-ST-L, IPA-ST, IPA-ST-UP, MA-ST-M, and MA-ST sols from Nissan Chemical America Co. Houston, Tex. and the SnowTex® ST-40, ST-50, ST-20L, ST-C, ST-N, ST-O, ST-OL, ST-ZL, ST-UP, and ST-OUP, also from Nissan Chemical America Co. Houston, Tex. The weight ratio of polymerizable material to nanoparticles can range from about 30:70, 40:60, 50:50, 55:45, 60:40, 70:30, 80:20 or 90:10 or more. The preferred ranges of wt % of nanoparticles range from about 10% by weight to about 60% by weight, and can depend on the density and size of the nanoparticles used.

In some cases, the nanovoided microstructured layer 600 may have a low optical haze value. In such cases, the optical haze of the nanovoided microstructured layer may be no more than about 5%, or no greater than about 4, 3.5, 3, 2.5, 2, 1.5, or 1%. For light normally incident on nanovoided microstructured layer 600, "optical haze" may (unless otherwise indicated) refer to the ratio of the transmitted light that deviates from the normal direction by more than 4 degrees to the total transmitted light. Index of refraction values of the disclosed films and layers may be measured by any suitable means, e.g., using a Metricon Model 2010 Prism Coupler, available from Metricon Corp., Pennington, N.J. Optical transmittance, clarity, and haze values of the disclosed films and layers can also be measured by any suitable means, e.g., using a Haze-Gard Plus haze meter, available from BYKGardiner, Silver Springs, Md.

In some cases, the nanovoided microstructured layer 600 may have a high optical haze. In such cases, the haze of the nanovoided microstructured layer 600 is at least about 40%, or at least about 50, 60, 70, 80, 90, or 95%.

In general, the nanovoided microstructured layer 600 can have any porosity or void volume fraction that may be desirable in an application. In some cases, the volume fraction of plurality of voids 620 in the nanovoided microstructured layer 600 is at least about 10%, or at least about 20, 30, 40, 50, 60, 70, 80, or 90%.

Binder 610 can be or include any material that may be desirable in an application. For example, binder 610 can be a light curable material that forms a polymer, such as a crosslinked polymer. In general, binder 610 can be any polymerizable material, such as a polymerizable material that is radiation-curable. In some embodiments binder 610 can be any polymerizable material, such as a polymerizable material that is thermally-curable.

Polymerizable material 610 can be any polymerizable material that can be polymerized by various conventional anionic, cationic, free radical, or other polymerization technique, which can be chemically, thermally, or initiated with actinic radiation, e.g., processes using actinic radiation including, e.g., visible and ultraviolet light, electron beam radiation and combinations thereof, among other means. The media that polymerizations can be carried out in include, including, e.g., solvent polymerization, emulsion polymerization, suspension polymerization, bulk polymerization, and the like.

Actinic radiation curable materials include monomers, and reactive oligomers, and polymers of acrylates, methacrylates, urethanes, epoxies, and the like. Representative examples of actinic radiation curable groups suitable in the practice of the present disclosure include epoxy groups, ethylenically unsaturated groups such as (meth)acrylate groups, olefinic carbon-carbon double bonds, allyloxy groups, alpha-methyl styrene groups, (meth)acrylamide groups, cyanoester groups, vinyl ethers groups, combinations of these, and the like. Free radically polymerizable groups are preferred. In some embodiments, exemplary materials include acrylate and methacrylate functional monomers, oligomers, and polymers, and in particular, multifunctional monomers that can form a crosslinked network upon polymerization can be used, as known in the art. The polymerizable materials can include any mixture of monomers, oligomers, and polymers; however the materials should be at least partially soluble in at least one solvent. In some embodiments, the materials should be soluble in the solvent monomer mixture.

Solvent can be any solvent that forms a solution with the desired polymerizable material. The solvent can be a polar or a non-polar solvent, a high boiling point solvent or a low boiling point solvent, and in some embodiments the solvent includes a mixture of several solvents. The solvent or solvent mixture may be selected so that the microstructured layer 530 formed is at least partially insoluble in the solvent (or at least one of the solvents in a solvent mixture). In some embodiments, the solvent mixture can be a mixture of a solvent and a non-solvent for the polymerizable material. In one particular embodiment, the insoluble polymer matrix can be a three-dimensional polymer matrix having polymer chain linkages that provide the three dimensional framework. The polymer chain linkages can prevent deformation of the microstructured layer 530 after removal of the solvent.

In some cases, solvent can be easily removed from the solvent-laden microstructured layer 530 by drying, for example, at temperatures not exceeding the decomposition temperature of either the insoluble polymer matrix or the substrate 516. In one particular embodiment, the temperature during drying is kept below a temperature at which the substrate is prone to deformation, e.g., a warping temperature or a glass-transition temperature of the substrate. Exemplary solvents include linear, branched, and cyclic hydrocarbons, alcohols, ketones, and ethers, including for example, propylene glycol ethers such as DOWANOL™ PM propylene glycol methyl ether, isopropyl alcohol, ethanol, toluene, ethyl acetate, 2-butanone, butyl acetate, methyl isobutyl ketone, methyl ethyl ketone, cyclohexanone, acetone, aromatic hydrocarbons, isophorone, butyrolactone, N-methylpyrrolidone, tetrahydrofuran, esters such as lactates, acetates, propylene glycol monomethyl ether acetate (PM acetate), diethylene glycol ethyl ether acetate (DE acetate), ethylene glycol butyl ether acetate (EB acetate), dipropylene glycol monomethyl acetate (DPM acetate), iso-alkyl esters, isohexyl acetate, isoheptyl acetate, isooctyl acetate, isononyl acetate, isodecyl acetate, isododecyl acetate, isotridecyl acetate or other iso-alkyl esters, water; combinations of these and the like.

The coating solution 515 can also include other ingredients including, e.g., initiators, curing agents, cure accelerators, catalysts, crosslinking agents, tackifiers, plasticizers, dyes, surfactants, flame retardants, coupling agents, pigments, impact modifiers including thermoplastic or thermoset polymers, flow control agents, foaming agents, fillers, glass and polymer microspheres and microparticles, other particles including electrically conductive particles, thermally conductive particles, fibers, antistatic agents, antioxidants, optical down converters such as phosphors, UV absorbers, and the like.

An initiator, such as a photoinitiator, can be used in an amount effective to facilitate polymerization of the monomers present in the coating solution. The amount of photoinitiator can vary depending upon, for example, the type of initiator, the molecular weight of the initiator, the intended application of the resulting microstructured layer, and the polymerization process including, e.g., the temperature of the process and the wavelength of the actinic radiation used. Useful photoinitiators include, for example, those available from Ciba Specialty Chemicals under the IRGACURE™ and DAROCURE™ trade designations, including IRGACURE™ 184 and IRGACURE™ 819.

The microstructured layer 530 may be cross-linked to provide a more rigid polymer network. Cross-linking can be achieved with or without a cross-linking agent by using high energy radiation such as gamma or electron beam radiation. In some embodiments, a cross-linking agent or a combination of cross-linking agents can be added to the mixture of polymerizable monomers, oligomers or polymers. The cross-linking can occur during polymerization of the polymer network using any of the actinic radiation sources described elsewhere.

Useful radiation curing cross-linking agents include multifunctional acrylates and methacrylates, such as those disclosed in U.S. Pat. No. 4,379,201 (Heilmann et al.), which include 1,6-hexanediol di(meth)acrylate, trimethylolpropane tri(meth)acrylate, 1,2-ethylene glycol di(meth)acrylate, pentaerythritol tri/tetra(meth)acrylate, triethylene glycol di(meth) acrylate, ethoxylated trimethylolpropane tri(meth)acrylate, glycerol tri(meth)acrylate, neopentyl glycol di(meth)acrylate, tetraethylene glycol di(meth)acrylate, 1,12-dodecanol di (meth)acrylate, copolymerizable aromatic ketone co-monomers such as those disclosed in U.S. Pat. No. 4,737,559 (Kellen et al.) and the like, and combinations thereof.

The coating solution 515 may also include a chain transfer agent. The chain transfer agent is preferably soluble in the monomer mixture prior to polymerization. Examples of suitable chain transfer agents include triethyl silane and mercaptans. In some embodiments, chain transfer can also occur to the solvent; however this may not be a preferred mechanism.

The polymerizing step preferably includes using a radiation source in an atmosphere that has a low oxygen concentration. Oxygen is known to quench free-radical polymerization, resulting in diminished extent of cure. The radiation source used for achieving polymerization and/or crosslinking may be actinic (e.g., radiation having a wavelength in the ultraviolet or visible region of the spectrum), accelerated particles (e.g., electron beam radiation), thermal (e.g., heat or infrared radiation), or the like. In some embodiments, the energy is actinic radiation or accelerated particles, because such energy provides excellent control over the initiation and rate of polymerization and/or crosslinking Additionally, actinic radiation and accelerated particles can be used for curing at relatively low temperatures. This avoids degrading or evaporating components that might be sensitive to the relatively high temperatures that might be required to initiate polymerization and/or crosslinking of the energy curable groups when using thermal curing techniques. Suitable sources of curing energy include UV LEDs, visible LEDs, lasers, electron beams, mercury lamps, xenon lamps, carbon arc lamps, tungsten filament lamps, flashlamps, sunlight, low intensity ultraviolet light (black light), and the like.

In some embodiments, binder 610 includes a multifunctional acrylate and polyurethane. This binder 610 can be a polymerization product of a photoinitiator, a multifunctional acrylate, and a polyurethane oligomer. The combination of a multifunctional acrylate and a polyurethane oligomer can produce a more durable nanovoided microstructured layer 600. The polyurethane oligomer is ethylenically unsaturated. In some embodiments, the polyurethane or polyurethane oligomer is capable of reacting with acrylates or "capped" with an acrylate to be capable of reacting with other acrylates in the polymerization reaction described herein.

In one illustrative process described above in FIG. 5, a solution is prepared that includes a plurality of nanoparticles (optional), and a polymerizable material dissolved in a solvent, where the polymerizable material can include, for example, one or more types of monomers. The polymerizable material is coated onto a substrate and a tool is applied to the coating while the polymerizable material is polymerized, for example by applying heat or light, to form an insoluble polymer matrix in the solvent. In some cases, after the polymerization step, the solvent may still include some of the polymerizable material, although at a lower concentration. Next, the solvent is removed by drying or evaporating the solution resulting in nanovoided microstructured layer 600 that includes a network or plurality of voids 620 dispersed in polymer binder 610. The nanovoided microstructured layer 600 includes an optional plurality of nanoparticles 640 dispersed in the polymer binder. The nanoparticles are bound to the binder, where the bonding can be physical or chemical.

The fabrication of the nanovoided microstructured layer 600 and microstructured articles described herein using the processes described herein can be performed in a temperature range that is compatible with the use of organic substances, resins, films, and supports. In many embodiments, the peak process temperatures (as determined by an optical thermometer aimed at the nanovoided microstructured layer 600 and microstructured article surface) is 200 degrees centigrade or less, or 150 degrees centigrade or less or 100 degrees centigrade or less.

In general, nanovoided microstructured layer 600 can have a desirable porosity for any weight ratio of binder 610 to plurality of nanoparticles 640. Accordingly, in general, the weight ratio can be any value that may be desirable in an application. In some cases, the weight ratio of binder 610 to a plurality of nanoparticles 640 is at least about 1:2.5, or at least about 1:2.3, or 1:2, or 1:1, or 1.5:1, or 2:1, or 2.5:1, or 3:1, or 3.5:1, or 4:1, or 5:1. In some cases, the weight ratio is in a range from about 1:2.3 to about 4:1.

Figure 6A:
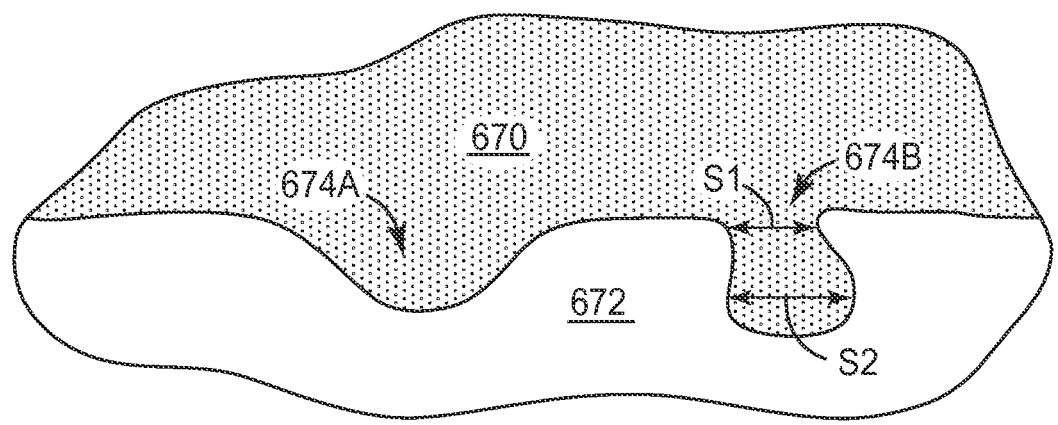
FIG. 6a is a schematic cross-sectional view of a portion of an interface between a first nanovoided layer and a second layer, demonstrating interpenetration of the second layer with the first layer.

We now pause to consider, in connection with FIG. 6a, whether there is any structural difference between (a) an article made by first forming a nanovoided layer with a microstructured surface, and then backfilling that microstructured surface with a conventional (non-nanovoided) material, e.g. a conventional polymer material, and (b) an article made by first forming a microstructured surface in a layer of conventional material, and then backfilling that microstructured surface with a nanovoided material layer. In both cases, the resulting article has an embedded interface, i.e., the microstructured surface, on one side of which is the nanovoided material layer and on the other side of which is the conventional material layer.

We have found that at least one structural difference can occur between the two articles, and that structural difference relates to the mechanism of interpenetration. In the article of case (b), where the layer of conventional material is microstructured before backfilling the microstructured surface with the nanovoided material, the nanovoided material would not typically migrate into the layer of conventional material because that layer typically presents a substantially solid, non-porous barrier at each facet or portion of the microstructured surface beyond which the nanovoided material cannot penetrate. In contrast, the article of case (a) is made in such a way that, at the time the conventional material (or precursor to such material, e.g. an uncured liquid polymer resin) is applied to the microstructured surface of the nanovoided layer, the facets or portions of the microstructured surface may contain surface voids, e.g. in the form of pits, pockets, or tunnels, into which the conventional material may migrate depending on properties of the surface voids, properties of the conventional material, and process conditions such as residence time of the conventional material in an uncured state. With suitable material properties and process conditions, the conventional material layer may interpenetrate the nanovoided layer, as shown schematically in FIG. 6a.

FIG. 6a shows in schematic cross-section a portion of an interface between a first nanovoided layer 672 and a second layer 670 of conventional material. The interface portion may, for example, be a microscopic portion of a structured surface defined between the two layers. The nanovoided layer 672 is shown to have a shallow surface void or depression 674A, as well as a deeper surface void 674B. The surface void 674B is characterized by a first transverse dimension S1 that is closer to the interface than a second transverse dimension S2, and the deeper dimension S2 is greater than the shallower dimension S1. We may characterize layer 670 as interpenetrating the layer 672 if the layer 670 not only conforms to the general shape of the layer 672 (e.g. depression 674A), but also if material from layer 670 migrates into or substantially fills at least some deep surface voids such as void 674a, in which a transverse dimension of the void nearer the interface is smaller than a transverse dimension farther from the interface. Such interpenetration can be achieved with nanovoided materials described herein.

In a first approach for characterizing an interpenetration depth of the conventional layer with the nanovoided layer, one may determine the amount by which material of the conventional layer has advanced beyond an interface average surface (along a direction or measurement axis perpendicular to the average surface), and one may characterize this amount in terms of the diameter of an average-sized void.

In a second approach for characterizing the interpenetration depth, one may again measure the amount by which the material of the conventional layer has advanced beyond the average surface, and then simply report this amount in terms of standard units of distance, e.g., micrometers or nanometers.

In a third approach for characterizing the interpenetration depth, one may again measure the amount by which the material of conventional layer has advanced beyond the average surface, but then characterize this amount in terms of the feature height of the structured surface at issue.

In exemplary embodiments, the interpenetration depth may be for example: with regard to the first approach, in a range from 1 to 10 average void diameters; with regard to the second approach, no more than 1, 10, 100, or 500 microns; with regard to the third approach, at least 5% of the feature height, or at least 10%, or at least 50%, or at least 95%, or at least 100%, or no more than 5%, or no more than 10%, or no more than 25%, or in a range from 5 to 25%, of the feature height. These exemplary ranges, however, should not be construed as limiting.

Further discussion regarding interpenetration can be found in commonly assigned U.S. patent application Ser. No. 61/405,128 entitled "Optical Films With Microstructured Low Refractive Index Nanovoided Layers and Methods Therefor", referenced elsewhere herein.

Having now described exemplary 3D light redirecting films suitable for use with autostereoscopic backlights and display panels, as well as exemplary nanovoided material layers capable of exhibiting very low refractive indices, we now describe how these elements can be combined to provide new families of optical films and articles. The new articles accomplish the same overall purpose as existing autostereoscopic systems, namely, directing light from one light source through a display panel to one eye of the observer, and directing light from another light source through the display panel to the other eye of the observer. The new articles, however, carry out this task with specific features that provided substantial advantages over current systems. Basic design features of the 3D light redirecting films discussed above, such as registration of lenticular elements with prismatic elements, or deliberate deviations from precise registration over the plane of the article, or the use of land portions, and so forth, should be understood as applying equally to the embodiments discussed below.

Generally, the new articles include at least one nanovoided layer having a low refractive index. This nanovoided layer interfaces with another layer, which is typically not nanovoided and has a substantially higher refractive index than the nanovoided layer, to form an embedded structured surface interface. The embedded structured surface may correspond to, for example: (a) a prism side of 3D light redirecting film; (b) a lenticular or lens side of 3D light redirecting film; (c) a fresnel lens; (d) a lenticular side of a light guide; (e) a prism side of a light guide; or combinations thereof. We have found that a given structured surface for a known component (i.e., a structured surface designed for use in an air medium) may not be functional or optimal if used as an embedded structured surface, where air is replaced with a nanovoided material. Instead, the embedded structured surface may require design modifications relative to an air-interface structured surface in order to function optimally. For example, the curvature of lenticular features may be adjusted, and/or the axial distance between a lenticular feature and its corresponding prismatic feature in a light redirecting film may be adjusted.

Figure 7:
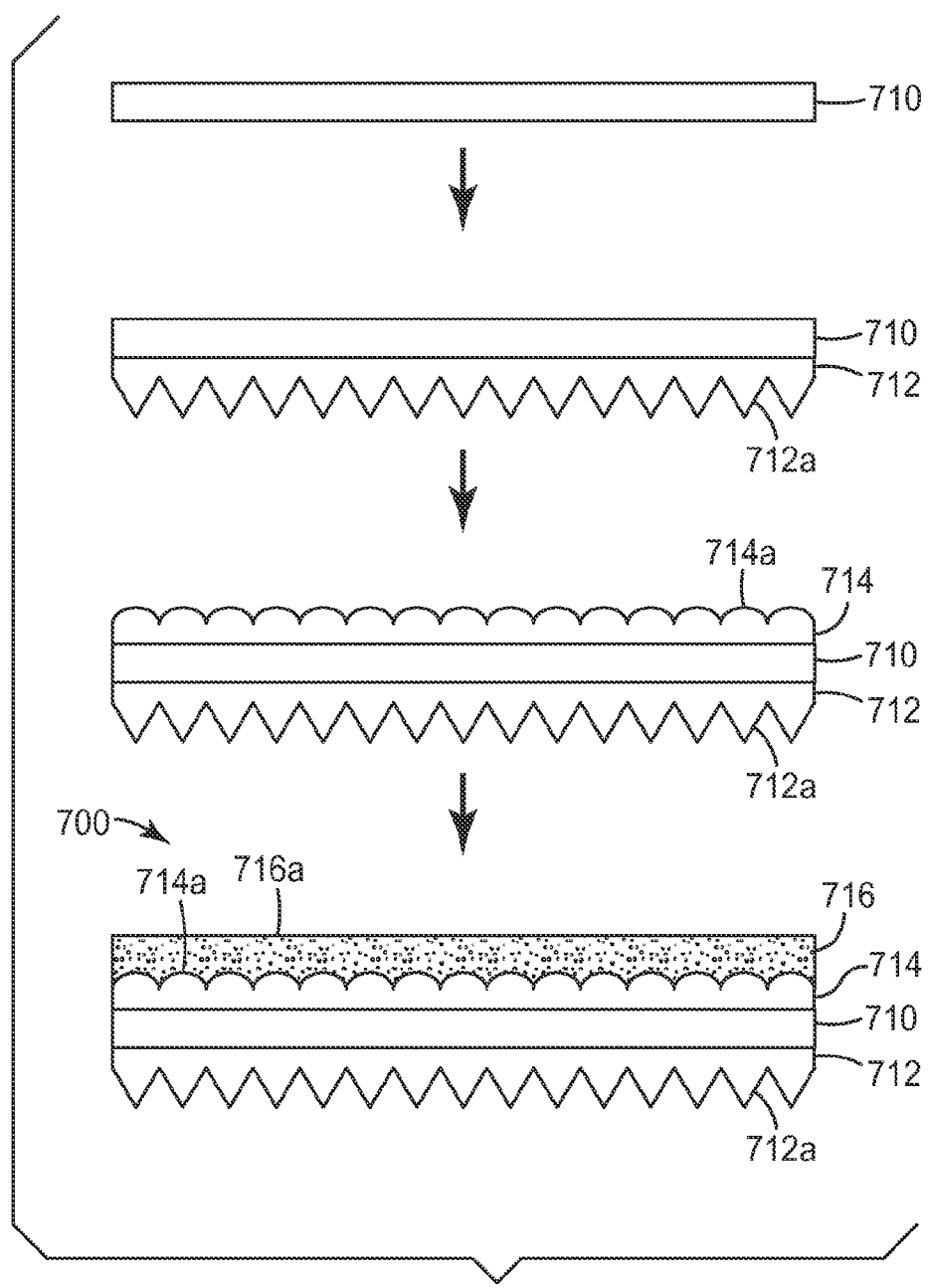
FIG. 7 shows a schematic cross-sectional view of an exemplary light redirecting film having an embedded structured surface, the figure also showing intermediate or precursor articles which demonstrate one way the light redirecting film can be made.

FIG. 7 shows a schematic cross-sectional view of an exemplary light redirecting film 700 having an embedded structured surface 714a, the figure also showing intermediate or precursor articles which demonstrate one way the light redirecting film can be made. In particular, a carrier film 710 is initially provided. The film 710 can be a freestanding film having sufficient strength and other material properties to undergo fabrication steps such as in an industrial continuous cast and cure (3C) process or other continuous roll-to-roll process (e.g. a continuous embossing process). Alternately, the film 710 may be batch processed. In any case, a layer 712 is applied to the carrier film 710, and the layer is provided with a structured surface 712a of prismatic features. This layer 712 may be made with a cast-and-cure process, with an embossing process, or with any other suitable process. Another layer 714 is applied to the opposite major surface of the carrier film 710, and this layer is provided with a structured surface 714a of curved or lenticular features. The layer 714 may also be made with a cast-and-cure process, an embossing process, or any other suitable process. In view of the fabrication step that will follow, in which the structured surface 714a will become embedded against a nanovoided material, the lenticular features of structured surface 714a may be designed with a curvature or other design feature that differs from a similar structured surface intended for exposure to air, in order to ensure optimal optical performance. In a final process step, the structured surface 714a is backfilled with a nanovoided layer 716, such that the structured surface 714a becomes embedded. In this embodiment, individual lenticular features of the structured surface 714a have curved surfaces that are curved generally towards the structured surface 712a.

The layers 710, 712, 714, 716 are all preferably joined to each other with no significant air gaps or air pockets therebetween. Furthermore, these layers are all preferably light transmissive in the wavelength range of interest, such as over the visible wavelength range, such that light can pass through the film 700, e.g. from surface 712a to surface 716a, with minimal absorptive loss, unless some amount of absorption is desired in the intended application. It may be desirable to eliminate or minimize haze in the layers of the film 700, but in some cases small to moderate amounts of haze in one, some, or all of these layers may be tolerable and/or desirable in specific applications. The nanovoided layer 716 is preferably composed of a nanovoided material as described elsewhere herein, and preferably has a relatively low refractive index, e.g., lower than any of the other material layers of the construction, or less than 1.35 or less than 1.3, or in a range from 1.15 to 1.35 or 1.15 to 1.3, for example. The other layers of the construction may be made of any suitable light-transmissive materials, e.g., suitable organic or inorganic materials, polymers or non-polymers, viscoelastic materials, adhesives (including pressure sensitive adhesives), or the like. Exemplary materials for use in the carrier film 710 include polyethylene terephthalate (PET), polyethylene naphthalate (PEN), and copolymers thereof, but other suitable polymeric or non-polymeric materials may also be used.

The structured surface 714a may be fabricated with a casting-and-curing technique, or with any other suitable technique capable of producing the desired optical features between the layers 714, 716. For example, imprinting, embossing, and injection molding may also be used to form the structured surface 714a in some cases. If the layers 714, 716 are made using a process similar to that of FIG. 5, the nanovoided layer 716 may constitute a backfill layer that was produced after the formation of the layer 714 and the structured surface 714a. In such case, the layer 716 would typically not interpenetrate the layer 714.

The light redirecting film 700, and the other light redirecting films discussed herein, may include other layers in addition to those depicted in their respective figures, and other features or characteristics in addition to those that are specifically discussed. For example, materials may be incorporated within the film to provide a desired degree of scattering, or to filter, color shift, or polarize the light. Surface coatings or structures, for example functional layers, can be applied to one or both outer exposed surfaces in order to further increase the functionality and possibly the value of the light extraction film. Such surface coatings can have, for example, optical, mechanical, chemical, or electrical functions. Examples of such coatings or structures include those having the following functions or properties: antifog; antistatic; antiglare; antireflection; antiabrasion (scratch resistance); antismudge; hydrophobic; hydrophilic; adhesion promotion; refractive elements; color filtering; ultraviolet (UV) filtering; spectral filtering; color shifting; color modification; polarization modification (linear or circular); light redirection; diffusion; or optical rotation. Removeable release liners may also be provided on one or both sides of the disclosed films and articles.

Figure 8:
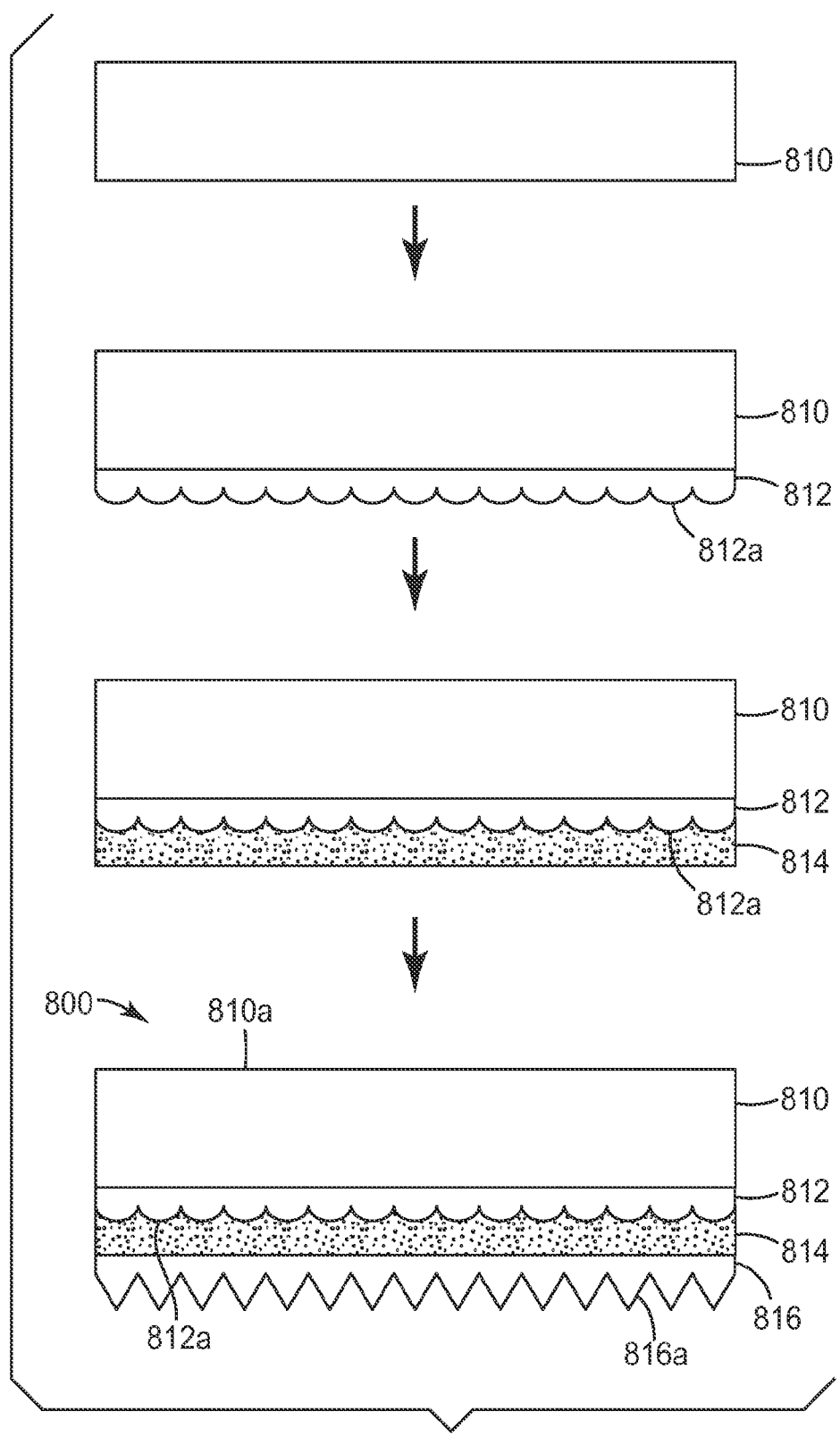
FIGS. 8-13 are similar to FIG. 7, but for alternative light redirecting film constructions.

FIG. 8 shows a schematic cross-sectional view of another exemplary light redirecting film 800 having an embedded structured surface 812a, the figure also showing intermediate or precursor articles which demonstrate one way the light redirecting film can be made. In particular, a carrier film 810 is initially provided. The film 810 can be a freestanding film having sufficient strength and other material properties to undergo fabrication steps such as in an industrial continuous cast and cure (3C) process or other continuous roll-to-roll process (e.g. a continuous embossing process). Alternately, the film 810 may be batch processed. In any case, a layer 812 is applied to the carrier film 810, and the layer is provided with a structured surface 812a of lenticular features. This layer 812 may be made with a cast-and-cure process, with an embossing process, or with any other suitable process. The structured surface 812a is then backfilled with a nanovoided layer 814, such that the structured surface 812a becomes embedded. In the depicted embodiment, the nanovoided layer 814 also planarizes the layer 812. Because the structured surface 812a is embedded, the lenticular features of structured surface 812a may be designed with a curvature or other design feature that differs from a similar structured surface intended for exposure to air, in order to ensure optimal optical performance. In a final process step, another layer 816 is provided atop the structured surface 814, and a structured surface 816a of prismatic features is provided on the exposed major surface of this layer.

There are several differences between this light extraction film 800 and the film 700 described previously. In film 800, individual lenticular features of the structured surface 812a have curved surfaces that are curved generally away from, rather than towards, the prismatic structured surface 816a. Also in film 800, both structured surfaces 812a, 816a are formed on the same side of the carrier film 810, rather than on opposite sides thereof. This allows the structured surfaces to be disposed closer together than would otherwise be possible. For example, the layers 814, 816 individually and in combination may be substantially thinner than the carrier film 810, e.g., a maximum or minimum axial distance from surface 812a to surface 816a may be less than 50, or 25, or 10 microns. The film 800 may contain no layer between the structured surfaces 812a, 816a that has physical characteristics making it suitable as a free-standing support film in roll-to-roll processing.

The layers 810, 812, 814, 816 are all preferably joined to each other with no significant air gaps or air pockets therebetween. Furthermore, these layers are all preferably light transmissive in the wavelength range of interest, as discussed above in connection with FIG. 7, although small to moderate amounts of haze in one, some, or all of the layers may be tolerable and/or desirable in specific applications. The composition of the nanovoided layer and the other layers may be as described above in connection with FIG. 7.

The structured surface 812a may be fabricated with a casting-and-curing technique, or with any other suitable technique capable of producing the desired optical features between the layers 812, 814 as discussed above. If the layers 812, 814 are made using a process similar to that of FIG. 5, the nanovoided layer 814 may constitute a backfill layer that was produced after the formation of the layer 812 and the structured surface 812a. In such case, the layer 814 would typically not interpenetrate the layer 812.

Figure 9:
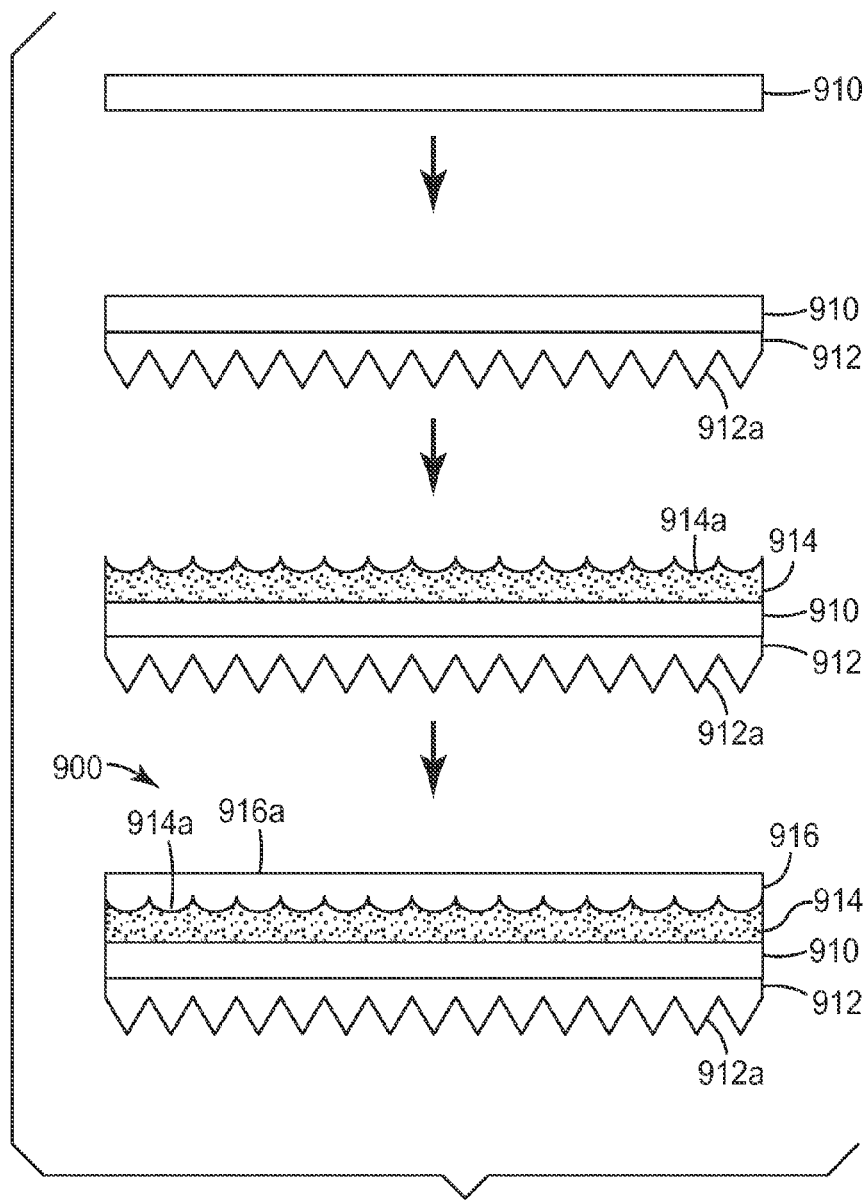

FIG. 9 shows a schematic cross-sectional view of another exemplary light redirecting film 900 having an embedded structured surface 914a, the figure also showing intermediate or precursor articles which demonstrate one way the light redirecting film can be made. In particular, a carrier film 910 is initially provided. The film 910 can be a freestanding film having sufficient strength and other material properties to undergo fabrication steps such as in an industrial continuous cast and cure (3C) process or other continuous roll-to-roll process (e.g. a continuous embossing process). Alternately, the film 910 may be batch processed. In any case, a layer 912 is applied to the carrier film 910, and the layer is provided with a structured surface 912a of prismatic features. This layer 912 may be made with a cast-and-cure process, with an embossing process, or with any other suitable process. A nanovoided layer 914 is applied to the opposite major surface of the carrier film 910, and this layer is provided with a structured surface 914a of curved or lenticular features. The nanovoided layer 914 may also be made with a cast-and-cure process, an embossing process, or any other suitable process. In a final process step, the structured surface 914a is backfilled with another (non-nanovoided) layer 916, such that the structured surface 914a becomes embedded. In this embodiment, individual lenticular features of the structured surface 914a have curved surfaces that are curved generally away from the structured surface 912a.

There are several differences and similarities between this light extraction film 900 and the films 700, 800 described previously. In film 900, individual lenticular features of the structured surface 914a have curved surfaces that are curved generally away from the prismatic structured surface 816a. This is like film 800, and unlike film 700. Also in film 900, the structured surfaces 912a, 914a are formed on opposite sides of the carrier film 910. This is like film 700, and unlike film 800.

The layers 910, 912, 914, 916 are all preferably joined to each other with no significant air gaps or air pockets therebetween. Furthermore, these layers are all preferably light transmissive in the wavelength range of interest, as discussed above in connection with FIG. 7, although small to moderate amounts of haze in one, some, or all of the layers may be tolerable and/or desirable in specific applications. The composition of the nanovoided layer and the other layers may be as described above in connection with FIG. 7. In an exemplary embodiment, the layer 916 may be or comprise a high refractive index optical adhesive, e.g., a high refractive index nanoparticle-filled adhesive.

The structured surface 912a may be fabricated with a casting-and-curing technique, or with any other suitable technique capable of producing the desired optical features between the layers 914, 916 as discussed above. If the layers 914, 916 are made using a process similar to that of FIG. 5, the layer 916 may constitute a backfill layer that was produced after the formation of the nanovoided layer 914 and the structured surface 914a. Consequently, depending on materials selection and process conditions, the layer 916 may interpenetrate the nanovoided layer 914 as discussed in connection with FIG. 6a. This is unlike films 700 and 800.

Figure 10:
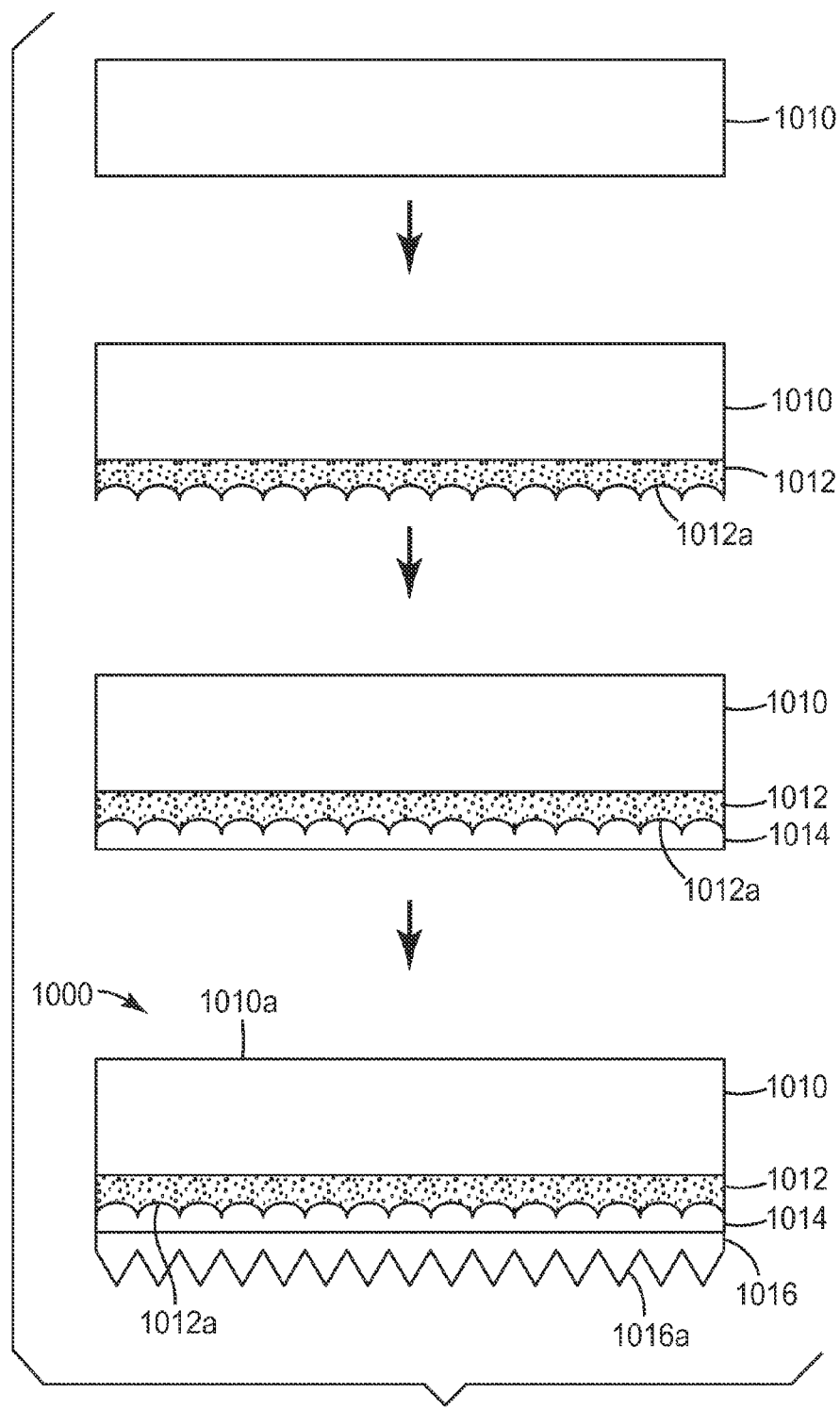

FIG. 10 shows a schematic cross-sectional view of another exemplary light redirecting film 1000 having an embedded structured surface 1012a, the figure also showing intermediate or precursor articles which demonstrate one way the light redirecting film can be made. In particular, a carrier film 1010 is initially provided. The film 1010 can be a freestanding film having sufficient strength and other material properties to undergo fabrication steps such as in an industrial continuous cast and cure (3C) process or other continuous roll-to-roll process (e.g. a continuous embossing process). Alternately, the film 1010 may be batch processed. In any case, a nanovoided layer 1012 is applied to the carrier film 1010, and the nanovoided layer is provided with a structured surface 1012a of lenticular features. This nanovoided layer 1012 may be made with a cast-and-cure process, with an embossing process, or with any other suitable process. The structured surface 1012a is then backfilled with another (non-nanovoided) layer 1014. As depicted, the layer 1014 also planarizes the nanovoided layer 1012. In a final process step, another (non-nanovoided) layer 1016 is provided atop the layer 1014, and the layer 1016 is provided with an exposed structured surface 1016a of prismatic elements. In some cases the layers 1014 and 1016 may be formed simultaneously. For example, the same process step that backfills the structured surface 1012a may also replicate the layer 1016 to provide the structured surface 1016a.

There are several differences and similarities between this light extraction film 1000 and the films 700, 800, 900 described previously. In film 1000, individual lenticular features of the structured surface 1012a have curved surfaces that are curved generally towards the prismatic structured surface 1016a. This is like film 700, and unlike films 800 and 900. Also in film 1000, the structured surfaces 1012a, 1016a are formed on the same side of the carrier film 1010. This is like film 800, and unlike films 700 and 900.

The layers 1010, 1012, 1014, 1016 are all preferably joined to each other with no significant air gaps or air pockets therebetween. Furthermore, these layers are all preferably light transmissive in the wavelength range of interest, as discussed above in connection with FIG. 7, although small to moderate amounts of haze in one, some, or all of the layers may be tolerable and/or desirable in specific applications. The composition of the nanovoided layer and the other layers may be as described above in connection with FIG. 7.

The structured surface 1012a may be fabricated with a casting-and-curing technique, or with any other suitable technique capable of producing the desired optical features between the layers 1012, 1014 as discussed above. If the layers 1012, 1014 are made using a process similar to that of FIG. 5, the layer 1014 may constitute a backfill layer that was produced after the formation of the nanovoided layer 1012 and the structured surface 1012a. Consequently, depending on materials selection and process conditions, the layer 1014 may interpenetrate the nanovoided layer 1012 as discussed in connection with FIG. 6a. This is like film 900, and unlike films 700 and 800.

Figure 11:
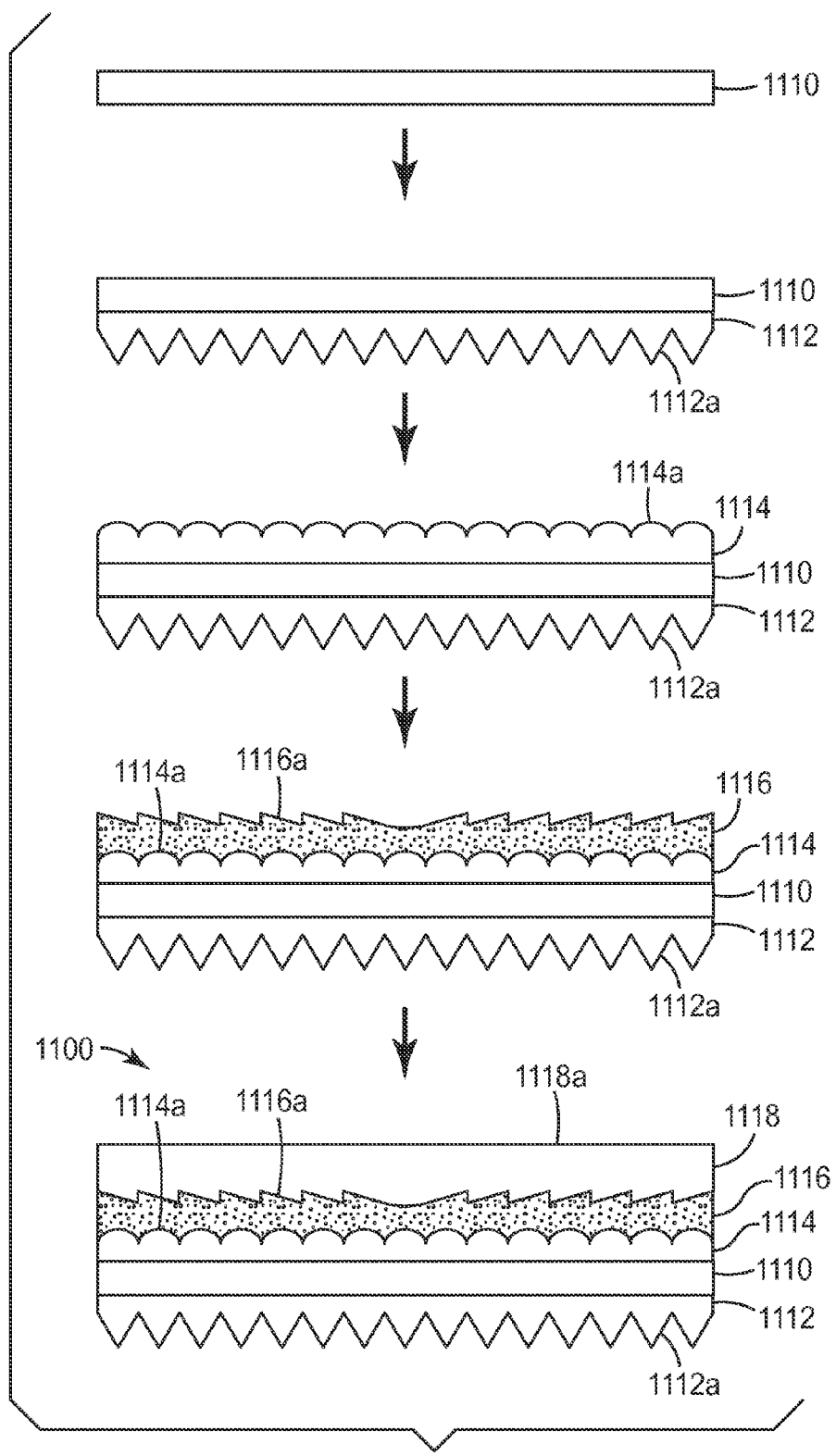

FIG. 11 shows a schematic cross-sectional view of an exemplary light redirecting film 1100 that has two embedded structured surfaces 1114a, 1116a, the figure also showing intermediate or precursor articles which demonstrate one way the light redirecting film can be made. In particular, a carrier film 1110 is initially provided. The film 1110 can be a freestanding film having sufficient strength and other material properties to undergo fabrication steps such as in an industrial continuous cast and cure (3C) process or other continuous roll-to-roll process (e.g. a continuous embossing process). Alternately, the film 1110 may be batch processed. In any case, a layer 1112 is applied to the carrier film 1110, and the layer 1112 is provided with a structured surface 1112a of prismatic features. This layer 1112 may be made with a cast-and-cure process, with an embossing process, or with any other suitable process. Another layer 1114 is then added to the opposite side of the carrier film 1110, and the layer 1114 is provided with a structured surface 1114a of lenticular elements. Layer 1114 may also be made with a cast-and-cure process or any other suitable process. The structured surface 1114a is then backfilled with a nanovoided layer 1116, and another structured surface 1116a is provided on the outer major surface of the nanovoided layer. The structured surface 1116a may be provided with facets that form a segmented lens, sometimes referred to as a Fresnel lens. Note again that the same process step that backfills the structured surface 1114a may also replicate the layer 1116 to provide the structured surface 1116a. The Fresnel lens can help to improve image fidelity at the horizontal edges of the display by bending rays towards the observer, potentially allowing for the construction of larger area autostereoscopic backlights and displays. In a final step, the structured surface 1116a is backfilled with another (non-nanovoided) layer 1118. As depicted, the layer 1118 also planarizes the nanovoided layer 1116.

There are several differences and similarities between this light extraction film 1100 and the films 700, 800, 900, 1000 described previously. In film 1100, individual lenticular features of the structured surface 1114a have curved surfaces that are curved generally towards the prismatic structured surface 1112a. This is like films 700 and 1000, and unlike films 800 and 900. Also in film 1100, the structured surfaces 1112a, 1114a are formed on opposite sides of the carrier film 1110 (although structured surfaces 1114a, 1116a are formed on the same side of the carrier film). This is like films 700 and 900, and unlike films 800 and 1000. Unlike all of films 700-1000, film 1100 contains two, rather than just one, embedded structured surface.

The layers 1110, 1112, 1114, 1116, and 1118 are all preferably joined to each other with no significant air gaps or air pockets therebetween. Furthermore, these layers are all preferably light transmissive in the wavelength range of interest, as discussed above in connection with FIG. 7, although small to moderate amounts of haze in one, some, or all of the layers may be tolerable and/or desirable in specific applications. The composition of the nanovoided layer and the other layers may be as described above in connection with FIG. 7.

The structured surface 1112a may be fabricated with a casting-and-curing technique, or with any other suitable technique capable of producing the desired optical features between the layers 1114, 1116 as discussed above. If the layers 1114, 1116 are made using a process similar to that of FIG. 5, the nanovoided layer 1116 may constitute a backfill layer that was produced after the formation of the layer 1114 and the structured surface 1114a. In such case, the layer 1116 would typically not interpenetrate the layer 1114. This is like films 700 and 800, and unlike films 900 and 1000. On the other hand, if the layers 1116, 1118 are made using a process similar to that of FIG. 5, the layer 1118 may constitute a backfill layer that was produced after formation of the nanovoided layer 1116 and the structured surface 1116a. Consequently, depending on materials selection and process conditions, the layer 1118 may interpenetrate the nanovoided layer 1116 as discussed in connection with FIG. 6a.

Figure 12:
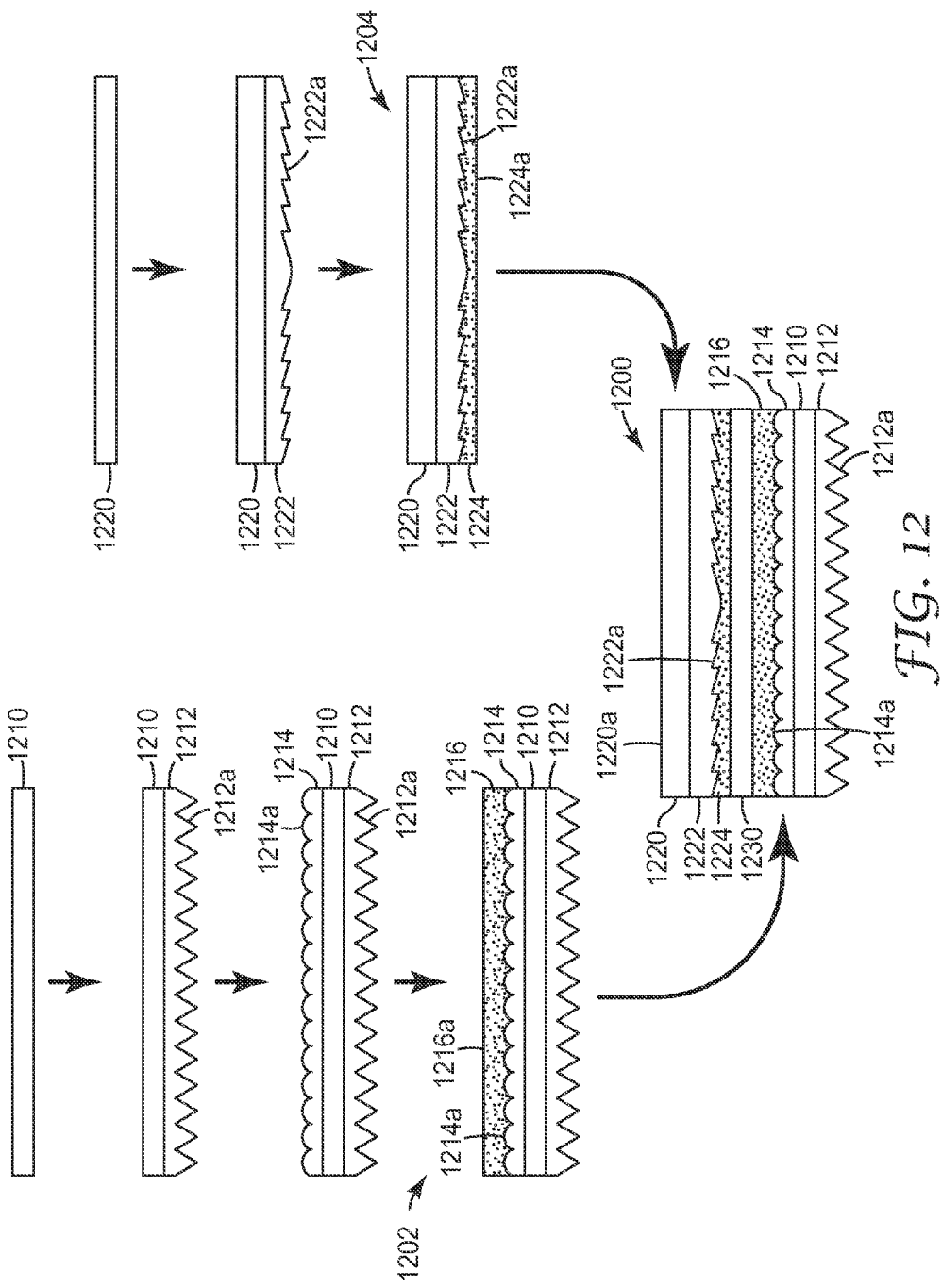

FIG. 12 shows a schematic cross-sectional view of an exemplary light redirecting film 1200 that also has two embedded structured surfaces 1214a, 1222a, the figure also showing intermediate or precursor articles which demonstrate one way the light redirecting film can be made. In particular, two carrier films 1210, 1220 are initially provided. These films can be freestanding films having sufficient strength and other material properties to undergo fabrication steps such as in an industrial continuous cast and cure (3C) process or other continuous roll-to-roll process (e.g. a continuous embossing process). Alternately, one or both of the films 1210, 1220 may be batch processed.

In any case, in a first procedure, a layer 1212 is applied to the carrier film 1110, and the layer 1112 is provided with a structured surface 1212a of prismatic features. This layer 1212 may be made with a cast-and-cure process, with an embossing process, or with any other suitable process. Another layer 1214 is then added to the opposite side of the carrier film 1210, and the layer 1214 is provided with a structured surface 1214a of lenticular elements. Layer 1214 may also be made with a cast-and-cure process or any other suitable process. The structured surface 1214a is then backfilled with a nanovoided layer 1216. As depicted, the nanovoided layer 1216 also planarizes the layer 1214. These procedures form an intermediate article 1202.

In a separate procedure, a layer 1222 is applied to the carrier film 1220, and the layer 1222 is provided with a structured surface 1222a. The structured surface 1222a may be provided with facets that form a segmented lens, sometimes referred to as a Fresnel lens. The Fresnel lens can help to improve image fidelity at the horizontal edges of the display by bending rays towards the observer, as mentioned above. Subsequently, the structured surface 1222a can be planarized with a nanovoided layer 1224. These procedures form another intermediate article 1204.

In a final step, the intermediate articles 1202, 1204 can be joined together by attaching an outer surface 1224a of article 1204 to an outer surface 1216a of article 1202 using an adhesive layer 1230 or other suitable joining layer, thus forming the finished light redirecting film 1200.

There are several differences and similarities between this light extraction film 1100 and the films 700, 800, 900, 1000, 1100 described previously. In film 1200, individual lenticular features of the structured surface 1214a have curved surfaces that are curved generally towards the prismatic structured surface 1212a. This is like films 700, 1000, and 1100, and unlike films 800 and 900. Also in film 1200, the structured surfaces 1212a, 1214a are formed on opposite sides of the carrier film 1210 (although structured surfaces 1214a, 1222a are formed on the same side of the carrier film). This is like films 700, 900, and 1100, and unlike films 800 and 1000. Unlike films 700-1000, but like film 1100, film 1200 contains two, rather than just one, embedded structured surface.

The layers 1210, 1212, 1214, 1216, 1220, 1222, 1224, and 1230 are all preferably joined to each other with no significant air gaps or air pockets therebetween. Furthermore, these layers are all preferably light transmissive in the wavelength range of interest, as discussed above in connection with FIG. 7, although small to moderate amounts of haze in one, some, or all of the layers may be tolerable and/or desirable in specific applications. The composition of the nanovoided layers and the other layers may be as described above in connection with FIG. 7. The nanovoided layers 1216, 1224 may have the same composition or different compositions.

The structured surface 1214a may be fabricated with a casting-and-curing technique, or with any other suitable technique capable of producing the desired optical features between the layers 1214, 1216 as discussed above. If the layers 1214, 1216 are made using a process similar to that of FIG. 5, the nanovoided layer 1216 may constitute a backfill layer that was produced after the formation of the layer 1214 and the structured surface 1214a. In such case, the layer 1216 would typically not interpenetrate the layer 1214. This is like films 700, 800, and 1100, and unlike films 900 and 1000. Similarly, if the layers 1222, 1224 are made using a process similar to that of FIG. 5, the nanovoided layer 1224 may constitute a backfill layer that was produced after formation of the layer 1222 and the structured surface 1222a. In such case, the layer 1224 would typically not interpenetrate the layer 1222.

The light redirection films 700 through 1200 all incorporate an embedded (or interior) structured surface and an exposed (or exterior) structured surface, in which the embedded structured surface comprises lenticular elements and the exposed structured surface comprises prismatic elements. Embodiments are also contemplated in which the prismatic structured surface is an embedded surface and the lenticular structured surface is an exposed surface, as well as embodiments in which both the prismatic and lenticular structured surfaces are embedded surfaces. These constructions represent a new class of stacked multicomponent optics in a single film assembly.

Figure 13:
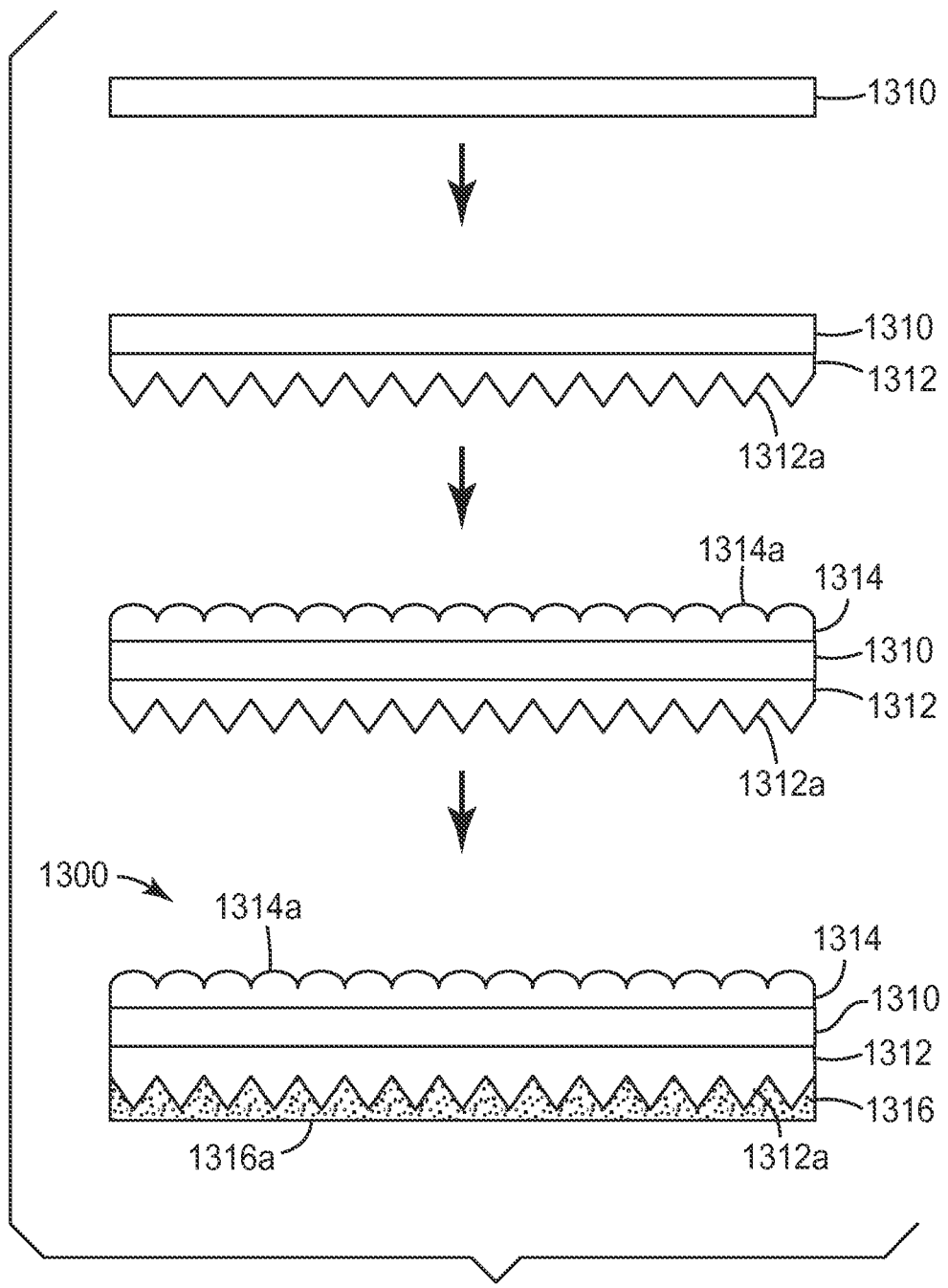

FIG. 13 shows a schematic cross-sectional view of another exemplary light redirecting film 1300 having an embedded structured surface 1312a, the figure also showing intermediate or precursor articles which demonstrate one way the light redirecting film can be made. In particular, a carrier film 1310 is initially provided. The film 1310 can be a freestanding film having sufficient strength and other material properties to undergo fabrication steps such as in an industrial continuous cast and cure (3C) process or other continuous roll-to-roll process (e.g. a continuous embossing process). Alternately, the film 1310 may be batch processed. In any case, a layer 1312 is applied to the carrier film 1310, and the layer is provided with a structured surface 1312a of prismatic features. This layer 1312 may be made with a cast-and-cure process, with an embossing process, or with any other suitable process. Another layer 1314 is applied to the opposite major surface of the carrier film 1310, and this layer is provided with a structured surface 1314a of curved or lenticular features. The layer 1314 may also be made with a cast-and-cure process, an embossing process, or any other suitable process. In a final process step, the structured surface 1312a is backfilled with a nanovoided layer 1316, such that the structured surface 1312a becomes embedded. As depicted, the nanovoided layer 1316 also planarizes the layer 1312.

There are several differences and similarities between this light extraction film 1300 and the films 700 through 1200 described previously. In film 1300, individual lenticular features of the structured surface 1314a have curved surfaces that are curved generally towards the prismatic structured surface 1312a. This is like films 700, 1000, 1100, 1200, and unlike films 800 and 900. Also in film 1300, the structured surfaces 1312a, 1314a are formed on opposite sides of the carrier film 1310. This is like films 700, 900, 1100, 1200, and unlike films 800 and 1000.

The layers 1310, 1312, 1314, 1316 are all preferably joined to each other with no significant air gaps or air pockets therebetween. Furthermore, these layers are all preferably light transmissive in the wavelength range of interest, as discussed above in connection with FIG. 7, although small to moderate amounts of haze in one, some, or all of the layers may be tolerable and/or desirable in specific applications. The composition of the nanovoided layer and the other layers may be as described above in connection with FIG. 7.

The structured surface 1312a may be fabricated with a casting-and-curing technique, or with any other suitable technique capable of producing the desired optical features between the layers 1312, 1316 as discussed above. If the layers 1312, 1316 are made using a process similar to that of FIG. 5, the nanovoided layer 1316 may constitute a backfill layer that was produced after the formation of the layer 1312 and the structured surface 1312a. In such case, the layer 1316 would typically not interpenetrate the layer 1312.

Figure 14:
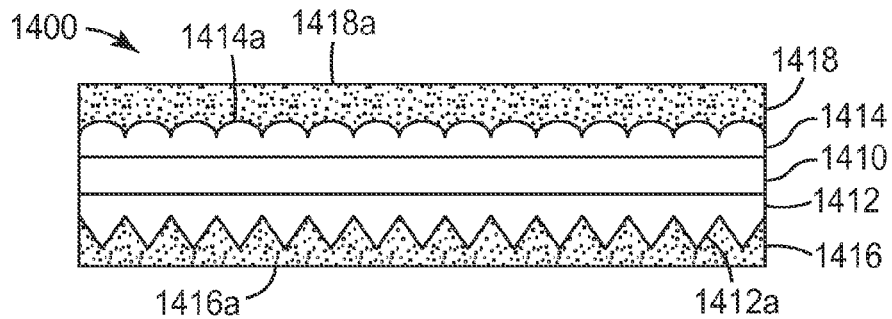
FIGS. 14 and 15 are a schematic cross-sectional views other exemplary light redirecting films.
Figure 15:
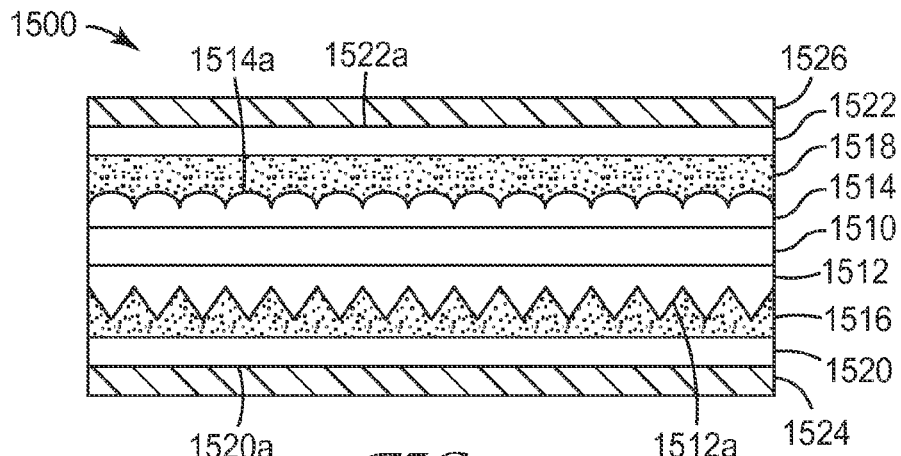

FIGS. 14 and 15 are a schematic cross-sectional views other exemplary light redirecting films in which both a prismatic structured surface and a lenticular structured surface are embedded. In FIG. 14, a light redirecting film 1400 includes a carrier film 1410 to which has been applied on opposite sides thereof a layer 1412, provided with a structured surface 1412a of prismatic features, and a layer 1414, provided with a structured surface 1414a of lenticular features. The structured surface 1412a is backfilled with a nanovoided layer 1416, which also planarizes the layer 1412. The structured surface 1414a is backfilled with another nanovoided layer 1418, which planarizes the layer 1414. The nanovoided layers 1416, 1418 may have the same composition or different compositions as desired. The film 1400 provides two planar outer surfaces, 1416a and 1418a, for convenient attachment to other components, e.g., other components of an autostereoscopic display system.

FIG. 15 depicts a light redirecting film 1500 similar to the film of FIG. 14, but further including transparent adhesive layers, covered by release liners, for convenient attachment to other components. The film 1500 includes a carrier film 1510 to which has been applied on opposite sides thereof a layer 1512, provided with a structured surface 1512a of prismatic features, and a layer 1514, provided with a structured surface 1514a of lenticular features. The structured surface 1512a is backfilled with a nanovoided layer 1516, which also planarizes the layer 1512. The structured surface 1514a is backfilled with another nanovoided layer 1518, which planarizes the layer 1514. The nanovoided layers 1516, 1518 may have the same composition or different compositions as desired. Two additional layers 1520, 1522, which are preferably adhesive (e.g. transparent pressure sensitive adhesive) layers, are applied respectively to the layers 1516, 1518. Removable release liners 1524, 1526 are provided on the outside of the film 1500 as shown to protect the adhesive layers until attachment to other components is imminent. The film 1500 provides two planar surfaces, 1520a and 1522a, for convenient attachment to other components, e.g., other components of an autostereoscopic display system.

Figure 16:
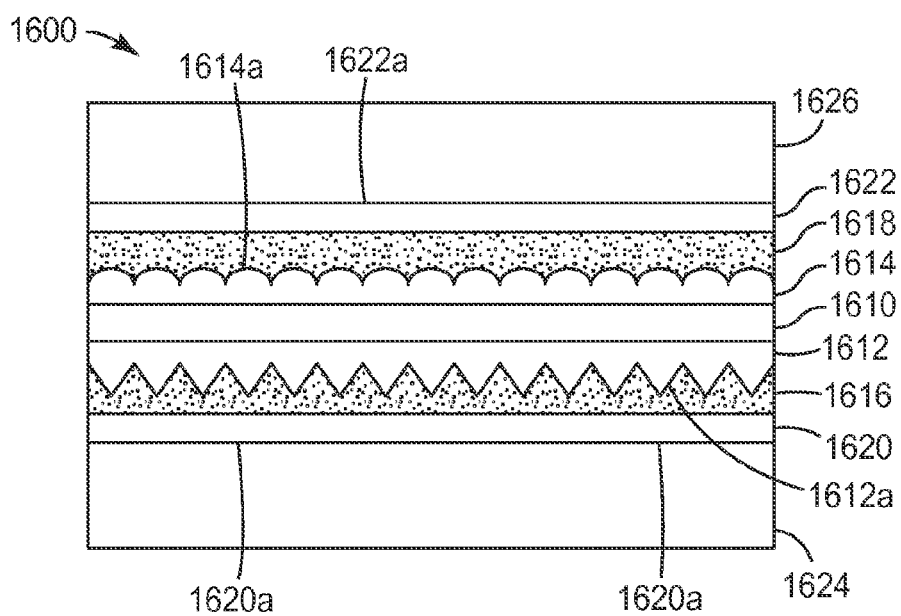
FIG. 16 is a schematic cross-sectional view of an optical device in which an exemplary light redirecting film is attached to other optical components such as a display panel and a light guide.

FIG. 16 is a schematic cross-sectional view of an optical device 1600 in which an exemplary light redirecting film, similar to that of FIG. 14 or 15, is attached to other optical components such as a display panel 1626 and a light guide 1624. The light redirecting film may comprise a carrier film 1610 to which has been applied on opposite sides thereof a layer 1612, provided with a structured surface 1612a of prismatic features, and a layer 1614, provided with a structured surface 1614a of lenticular features. The structured surface 1612a is backfilled with a nanovoided layer 1616, which also planarizes the layer 1612. The structured surface 1614a is backfilled with another nanovoided layer 1618, which planarizes the layer 1614. The nanovoided layers 1616, 1618 may have the same composition or different compositions as desired. Two additional layers 1620, 1622, which are preferably adhesive (e.g. transparent pressure sensitive adhesive) layers, are applied respectively to the layers 1616, 1618. These adhesive layers can be used to attach the light redirecting film to a display panel 1626, and also to a light guide 1624. The display panel and light guide may be of the type adapted for autostereoscopic display systems.

In some cases it may be desirable to attach the light redirecting film to a light transmissive member other than a light guide or display panel, wherein the member is adapted to provide mechanical rigidity or stability, e.g., to prevent the light redirecting film from warping or otherwise deforming. Thus, for example, one or both of display panel 1626 and light guide 1624 may be replaced with a relatively stiff or rigid substrate, such as a stiff piece of transparent glass or plastic, or a transparent plate or other transparent support. In one embodiment, display panel 1626 may be replaced with such a substrate, and layers 1616, 1620, and 1624 may be omitted. In another embodiment, light guide 1624 may be replaced with such a substrate, and layers 1618, 1622, and 1626 may be omitted. In still another embodiment, both the display panel 1626 and the light guide 1624 may be replaced with such a substrate.

Figure 17:
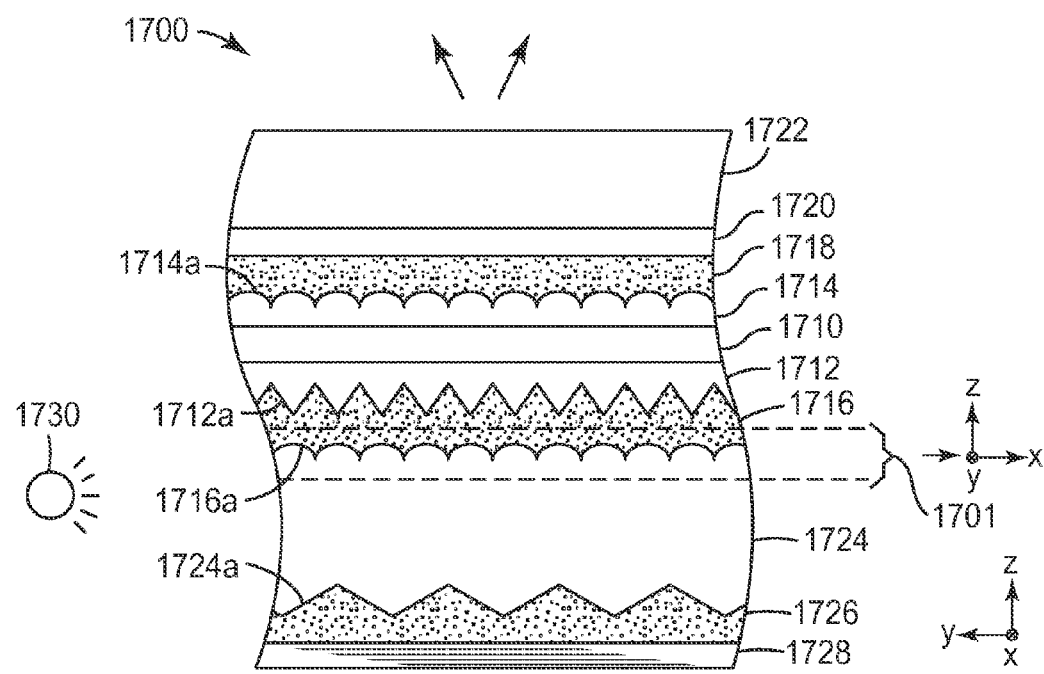
FIG. 17 is a schematic cross-sectional view of another optical device in which an exemplary light redirecting film is attached to a display panel and a light guide.

A device 1700 similar to the device of FIG. 16 is shown with some additional detail in FIG. 17. In device 1700, a light guide, light redirecting film, and display panel are again all combined together into a single unit with no air gaps or air pockets between layers. The light redirecting film may comprise a carrier film 1710 to which has been applied on opposite sides thereof a layer 1712, provided with a structured surface 1712a of prismatic features, and a layer 1714, provided with a structured surface 1714a of lenticular features. The structured surface 1712a is backfilled with a nanovoided layer 1716, which is provided with another structured surface 1716a defining lenticular structures. The structured surface 1714a is backfilled with another nanovoided layer 1718, which planarizes the layer 1714. The nanovoided layers 1716, 1718 may have the same composition or different compositions as desired. An additional layer 1720, which is preferably an adhesive (e.g. transparent pressure sensitive adhesive) layer, is applied to the nanovoided layer 1718. The adhesive layer 1720 is used to attach the light redirecting film to a display panel 1722. A light guiding layer 1724 attaches to the structured surface 1716a of the nanovoided layer 1716. The layer 1724 has a sufficient thickness and sufficiently low absorption losses so that light from edge-mounted light sources (one of which is shown as source 1730) can propagate through the layer 1724 and be directed out of an output surface of the device over the working area of the device, toward the left or right eye of an observer. A rear surface 1724a of the light guiding layer 1724 is structured to provide shallow prisms or other structures suitable for directing light propagating through the light guide towards the observer. In this embodiment, a third nanovoided layer 1726 is provided at the structured surface 1724a to ensure adequate reflectivity of the structured surface. The nanovoided layer 1726 may join a back reflector 1728, which may be or comprise a highly reflective multilayer optical film (MOF) such as Vikuiti™ Enhanced Specular Reflector (ESR) film. The display panel and light guide may be of the type adapted for autostereoscopic display systems.

One aspect of FIG. 17 deserves explanation. Except for the region 1701, the figure is shown as a schematic cross-sectional view in a Cartesian y-z plane. The region 1701, however, is a schematic cross-sectional view in the orthogonal x-z plane. This drawing peculiarity is provided for convenience so that the lenticular structures of structured surface 1716a, which extend along an axis perpendicular to the axis along which the features of structured surfaces 1712a, 1714a, and 1724a extend, can be easily recognized.

Figure 18:
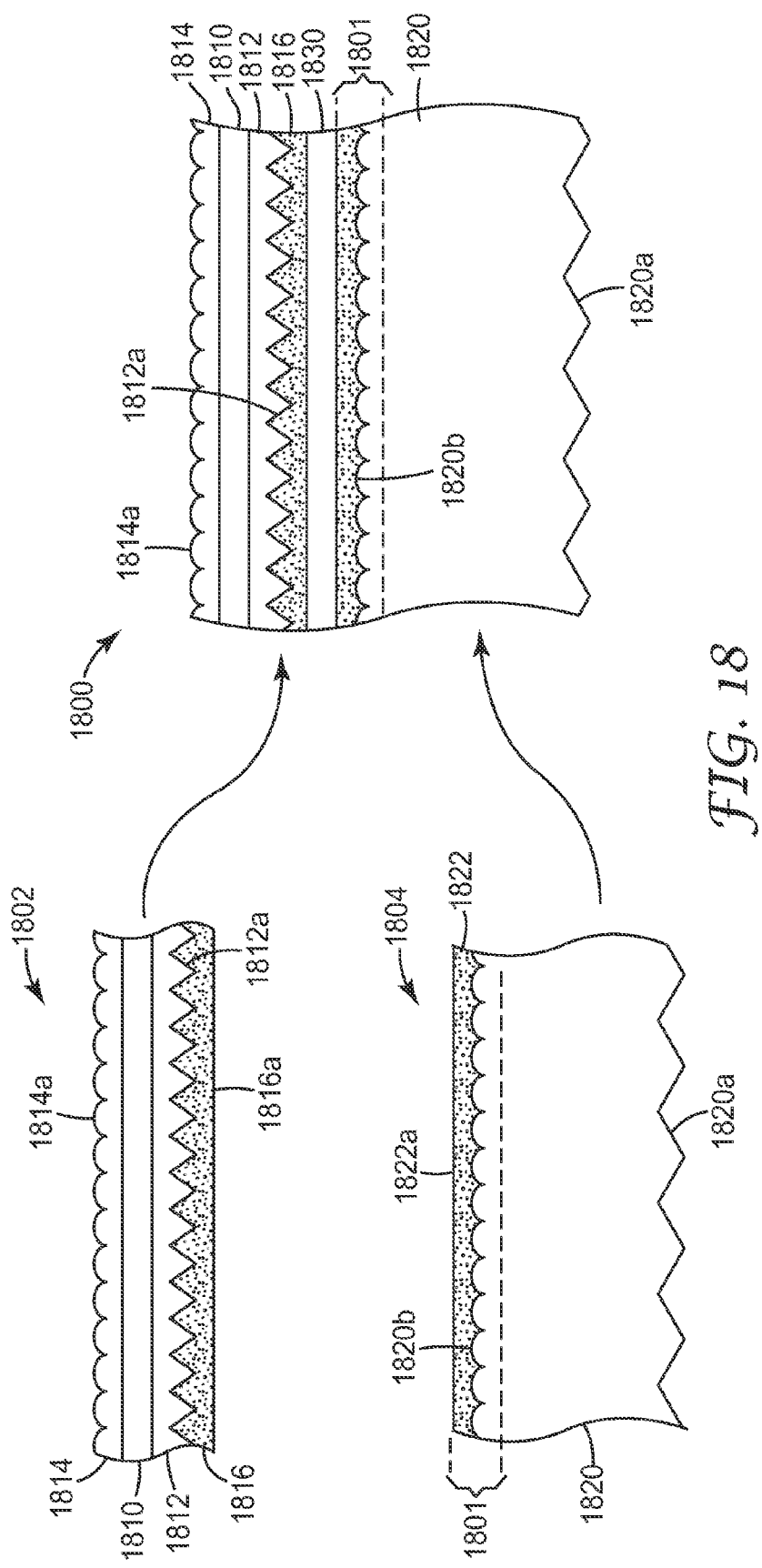
FIG. 18 depicts a schematic cross-sectional view of an exemplary light redirecting film, an exemplary light guide, and an exemplary optical device made that incorporates the light redirecting film and the light guide.

Turning now to FIG. 18, we see there a schematic cross-sectional view of an exemplary light redirecting film 1802, an exemplary light guide 1804, and an exemplary optical device 1800 that incorporates the light redirecting film and the light guide. The light redirecting film 1802 includes a carrier film 1810 to which has been applied on opposite sides thereof a layer 1812, provided with a structured surface 1812a of prismatic features, and a layer 1814, provided with a structured surface 1814a of lenticular features. The structured surface 1812a is backfilled with a nanovoided layer 1816, which also planarizes the layer 1812. Separately, a light guiding layer 1820 is fashioned to have a back structured surface 1820a of shallow prismatic elements and a front structured surface 1820b of lenticular structures. (Similar to FIG. 17, the view of FIG. 18 is divided in the sense that the regions 1801 show a view of the device in a plane perpendicular to that of the remainder of the figure.) The structured surface 1820b is backfilled with a nanovoided layer 1822, which also planarizes the front or top of the light guiding layer 1820. To form the finished device 1800, the planarized surface 1816a of the light redirecting film 1802 and the planarized surface 1822a of the light guide 1804 are joined together with a transparent adhesive layer 1830.

Figure 19:
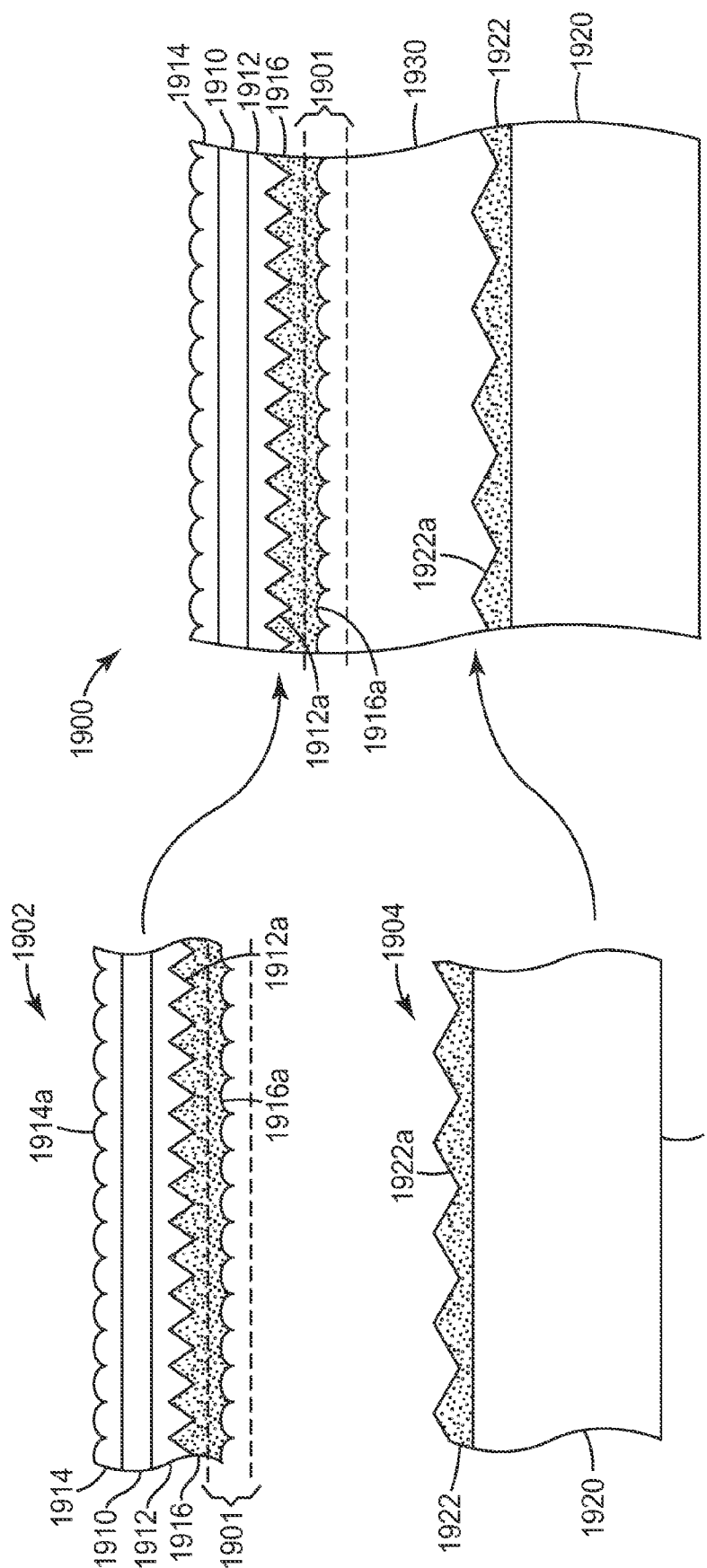
FIG. 19 depicts a schematic cross-sectional view of an exemplary light redirecting film, a structured substrate, and an optical device that incorporates the light redirecting film and the substrate.

FIG. 19 shows a schematic cross-sectional view of an exemplary light redirecting film 1902, a structured substrate 1904, and an optical device 1900 that incorporates the light redirecting film, the substrate, and a light guide formed between the substrate and the light redirecting film. The light redirecting film 1902 includes a carrier film 1910 to which has been applied on opposite sides thereof a layer 1912, provided with a structured surface 1912a of prismatic features, and a layer 1914, provided with a structured surface 1914a of lenticular features. The structured surface 1912a is backfilled with a nanovoided layer 1816, which also is provided with another structured surface 1916a of lenticular structures that extend along an axis perpendicular to the longitudinal direction of the lenticular features of structured surface 1914a and perpendicular to the longitudinal direction of the prismatic features of structured surface 1912a. (Similar to FIGS. 17 and 18, the view of FIG. 19 is divided in the sense that the regions 1901 show a view of the device in a plane perpendicular to that of the remainder of the figure.) Separately, a substrate 1920 is provided with a nanovoided layer 1922 having a structured surface 1922a defining shallow prismatic features. The nanovoided layers 1916, 1922 may have the same composition or different compositions. To form the finished device 1900, the structured surface 1916a of the light redirecting film 1902 and the structured surface 1922a of the substrate 1904 are joined together with a thick layer 1930 of transparent material, which is adapted to form a light guide by virtue of its thickness, its refractive index properties (its refractive index being substantially greater than the adjacent nanovoided layers 1916, 1922, e.g. greater by at least 0.2, 0.3, 0.4, or 0.5), and the structured characteristics of its outer surfaces. Suitable materials for use as the layer 1930 include optically clear adhesives and high viscosity resins. Further details regarding suitable materials can be found in commonly assigned U.S. Patent Application 61/294,671, filed Jan. 13, 2010, which is incorporated herein by reference in its entirety. The substrate 1920 is preferably highly reflective, so as to reflect light that escapes the surface 1922 of the light guide 1930 back into the light guide. The substrate thus may comprise, for example, a reflective metal coating, and/or a reflective multilayer optical film such as Vikuiti™ Enhanced Specular Reflector (ESR) film.

EXAMPLES 3D light redirecting film suitable for use in an autostereoscopic display was fabricated, with a bottom or rear structured surface comprising prismatic features and a top or front structured surface comprising lenticular features. The front structured surface was backfilled and planarized with a nanovoided ultra low index (ULI) material layer. The planarized light redirecting film (now with an embedded structured lenticular surface) was thus in a format in which it could be laminated to a rigid transparent substrate (the substrate simulating the back side of an LCD panel) by attaching the planar surface of the nanovoided layer to the rigid substrate. One goal of the tests was to determine if the light directing film could provide adequate optical performance with the embedded lenticular surface.

Autostereoscopic displays made with 3D light redirecting film typically do not incorporate films or other components that diffuse light to any appreciable extent, thus, one design consideration for the 3D light redirecting film is the avoidance of moiré patterns. The pitch of the prismatic and lenticular features for the 3D light redirecting film was optimized to reduce moiré effects for a particular LCD panel. The optimization yielded a pitch of 46.000 microns for the lenticular features and 46.009 microns for the prismatic features. This optimized pitch in turn has an effect on what film thicknesses would be used, since the film thickness controls the distance between a given prismatic feature and its corresponding lenticular feature.

After a conventional 3D light redirecting film is made and placed into conventional a autostereoscopic display it is subjected to detrimental environmental conditions such as: abrasion from debris between the light redirecting film and neighboring components; wet out of the lenticular features on the front of the light redirecting film to the LCD panel; and warp caused by the heating and cooling of the device and the material properties of the film. Issues related to film warp are related to the thickness of the film used to make the light redirecting film, but due to the relationship of film thickness to moiré effects, the film thickness cannot simply be increased in an attempt to reduce warping.

When one considers backfilling and planarizing the front lenticular structured surface of a 3D light redirecting film with a nanovoided low refractive index material, the replacement of air with the nanovoided material introduces optical design issues for the light redirecting film. In some cases the introduction of the low index nanovoided material can require a change in the caliper of the film (i.e., a change in the axial distance from the prismatic structured surface to the lenticular structured surface). Other potential approaches of adapting the film for the presence of the nanovoided material include: replacing the flat prism facets on the prismatic structured surface with slightly curved facets, as shown by structured surface 2262 in FIG. 22; and/or changing the shape of the curved lenticular surfaces, e.g. to aspherical surfaces so as to correct for aberrations with or without changing the film caliper.

Three different 3D light redirecting films were made and tested. A first film was made that did not incorporate any nanovoided layers. This film had a construction similar to the film 700 of FIG. 7, except that no nanovoided layer was included. The carrier film (see film 710 in FIG. 7) for this embodiment was PET having a caliper of 2 mils (50.8 microns). The lenticular features (see structured surface 714a of FIG. 7) had a pitch of 44.000 microns and a simple curvature (cylindrically shaped) of 36.5 microns, and were composed of a blended acrylate resin having a refractive index of 1.500. The prism features (see structured surface 712a of FIG. 7) had a pitch of 44.008 microns and a prism angle of 60 degrees, and were composed of the same blended acrylate resin, of refractive index 1.500. Both the lenticular structured surface and the prismatic structured surface of this first film were exposed to air. The film was generally rectangular in shape with a length of 88 mm and a width of 118 mm.

Second and third 3D light redirecting films were made that included a nanovoided layer that planarized the lenticular microstructured surface of the film, and had a construction similar to the film 700 in FIG. 7. These 3D films, which each had a length of 65 mm and a width of 88 mm, incorporated certain modifications relative to the first 3D film to compensate for the presence of the nanovoided layer and the embedded nature of the lenticular structured surface. For the second 3D film, the modification was a change in the shape of the lenticular structured surface to an aspherical shape—or more precisely, a shape whose curved extended surface deviated from that of a right circular cylinder by having a curvature that changed from the top to the edge of each lenticular feature. The lenticular structured surface was planarized with a layer of nanovoided material having a refractive index of about 1.2 and a thickness of about 3 microns from the tops of the lenticular features and 15 microns from the edges of the lenticular features. Other design details, including the caliper of the carrier film, were the same as the first 3D film. For the third 3D film, the modifications were a change in the shape of the lenticular structured surface (the same shape used for the second 3D film), and a change in the shape of the facets of the prismatic structured surface (see structured surface 712a of FIG. 7)—rather than flat facets, the facets were curved a small amount to be slightly convex such that the prism angle at the apex was about 68.6 degrees. Other design details, including planarization of the lenticular structured surface by the nanovoided material, were the same as the second 3D film.

Figure 20A:
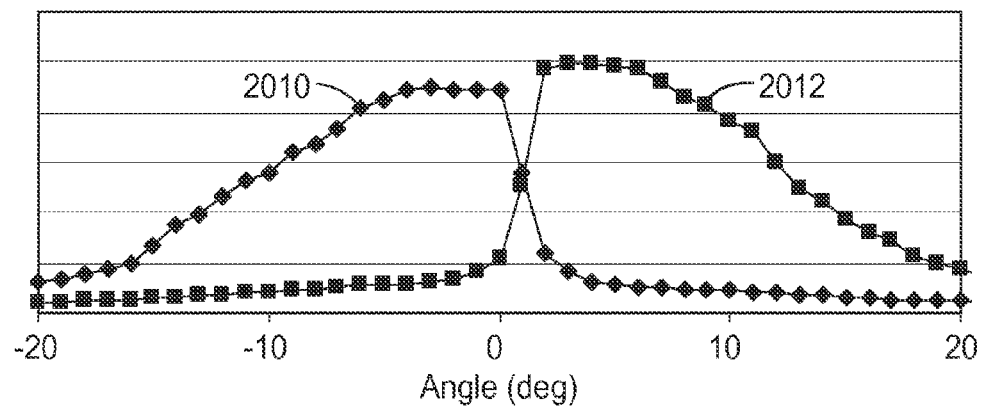
FIG. 20a is a graph of measured light intensity versus observation angle for an autostereoscopic-compatible backlight using a (non-attached) light redirecting film whose outer structured surfaces were exposed to air.
Figure 20B:
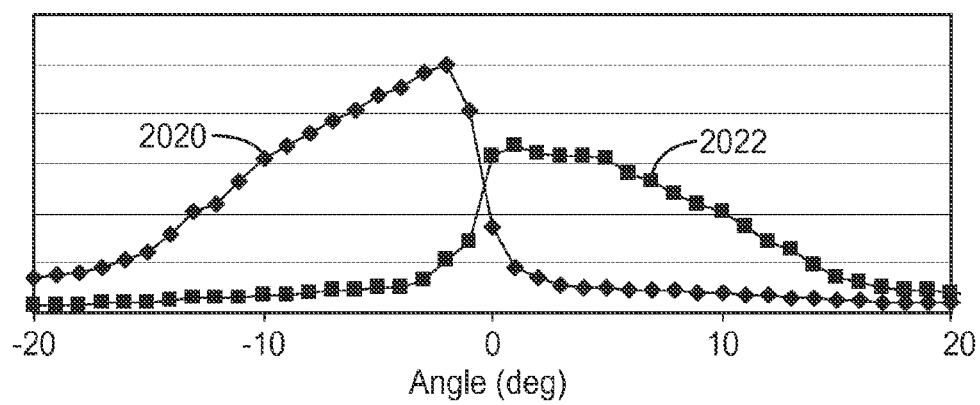
FIGS. 20b and 20c are graphs of measured light intensity versus observation angle for autostereoscopic-compatible backlights that used light redirecting films whose lenticular structured surfaces were planarized with a nanovoided material layer.
Figure 20C:
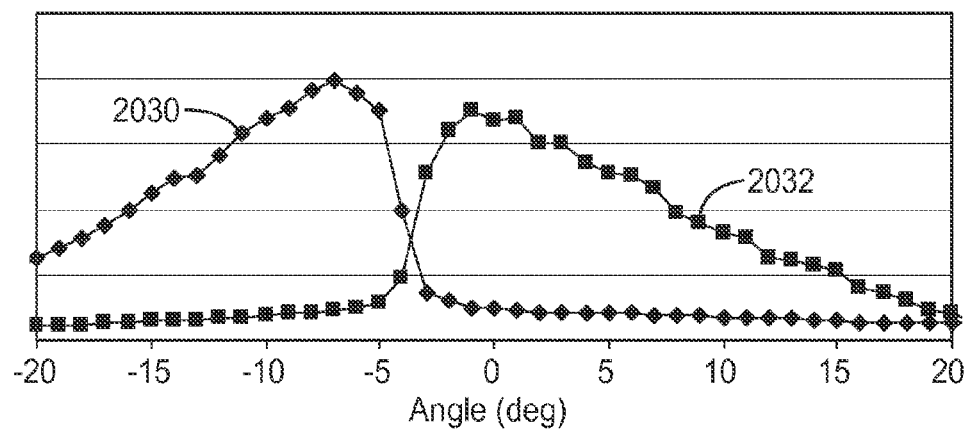

The first, second, and third 3D films as described were alternately placed in front of a standard autostereoscopic light guide (see e.g. FIG. 3), with an air gap between the 3D film and the light guide, and the angular distribution of light emitted from the 3D film was measured with an Autronics conoscope. FIG. 20a shows the angular output for the first 3D film. Curve 2010 represents the emitted left eye light beam, when the light source on one edge of the light guide was energized, and curve 2012 represents the emitted right eye light beam, when the light source on the other edge of the light guide was energized. These curves are typical for a standard autostereoscopic backlight (light guide/3D film combination). FIG. 20b shows the angular output for the second 3D film. Curve 2020 represents the emitted left eye light beam, and curve 2022 represents the emitted right eye light beam. FIG. 20c shows the angular output for the third 3D film. Curve 2030 represents the emitted left eye light beam, and curve 2032 represents the emitted right eye light beam. For each of the figures, the crossing locations of the left and right light distributions are related to the alignment of the lenticular features with the prismatic features on the 3D film. The shapes of the light distributions in FIGS. 20b and 20c are nearly the same or similar to those of FIGS. 20a, indicating that the 3D light redirecting films having the embedded structured surface and nanovoided material layer could be made to work in the same or similar fashion as a standard 3D light redirecting film.

Figure 21A:
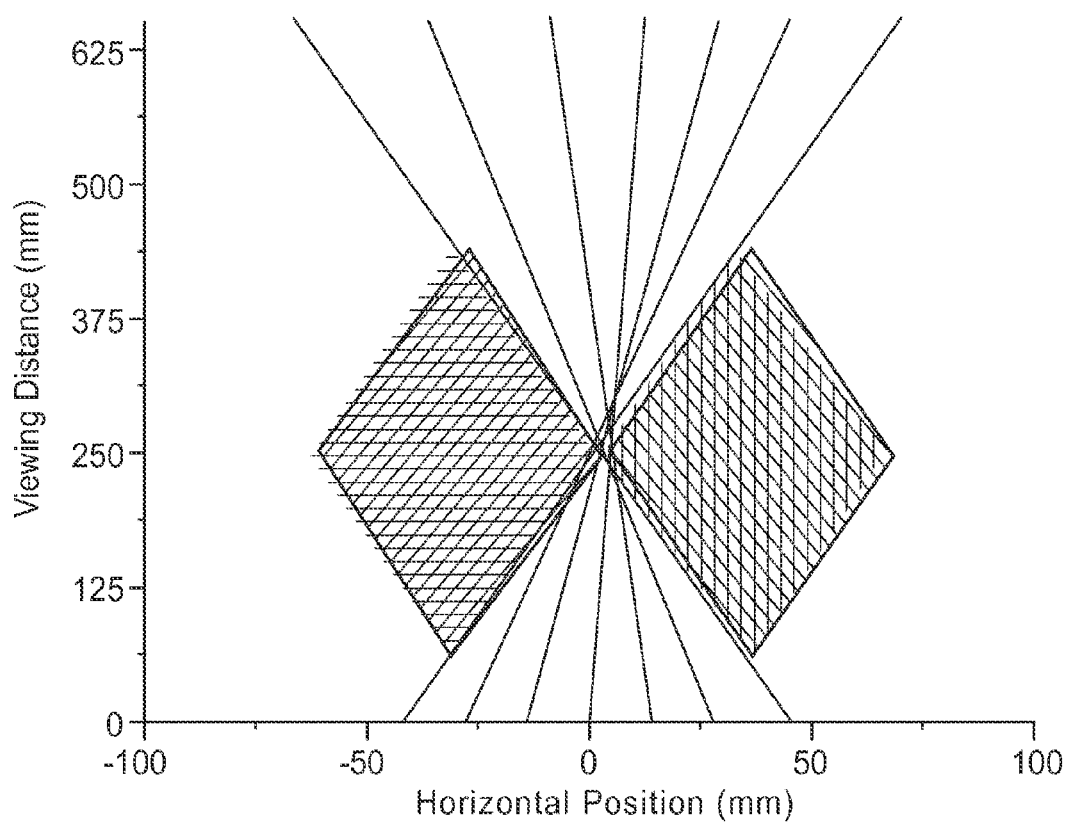
Figure 21B:
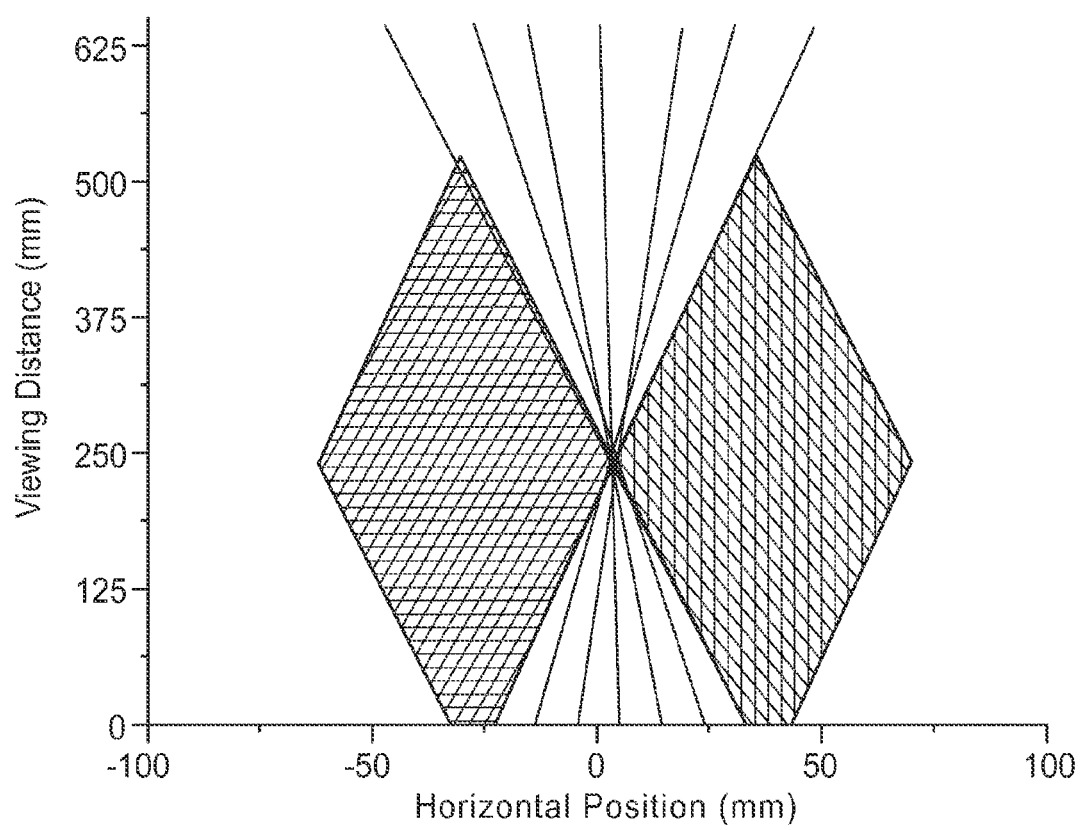
FIGS. 21b and 21c are viewing freedom diagrams for the backlights of FIGS. 20b and 20c, respectively.
Figure 21C:
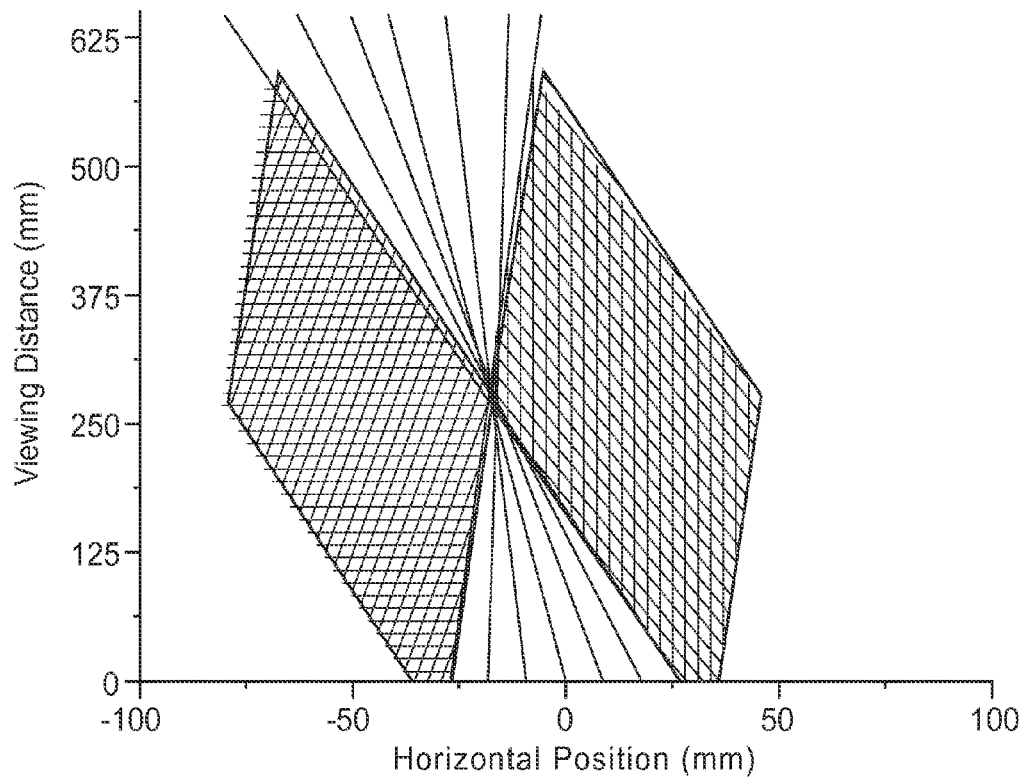
Figure 21D:
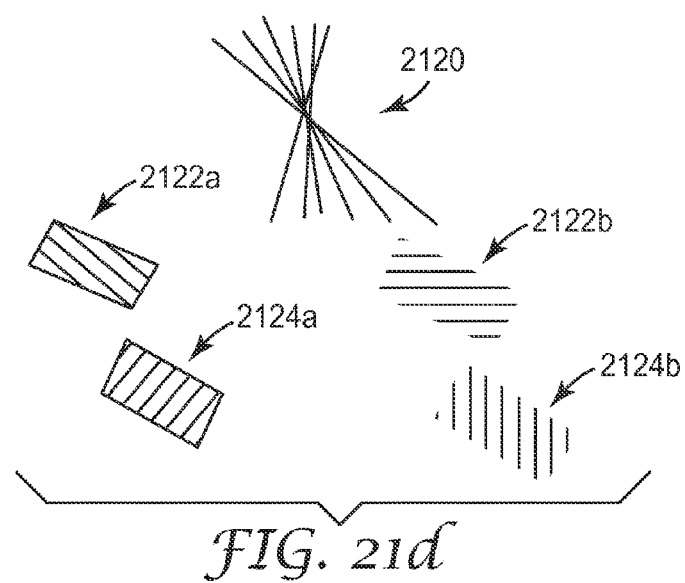
FIG. 21d is a legend or key for FIGS. 21a-c showing the various symbols that are used in those figures.

Further conoscope measurements were made for different portions of the output surface of the light redirecting films, and the results were analyzed for each of the three fabricated 3D films described above. The data analysis included a determination of key parameters pertaining to viewing freedom, including crossing point projections, right eye viewing lobe, and left eye viewing lobe, which relate to the region of space the observer can be located and still observe the image stereoscopically. The viewing freedom results are plotted in FIGS. 21 a, b, and c for the fabricated first, second, and third 3D films respectively, and FIG. 21d provides a legend or key for FIGS. 21a-c showing the various symbols that are used in those figures. The crossing points of the left and right light distributions for each point was calculated. The projection of the crossing points was extrapolated into space, which is shown by the lines 2120 (FIG. 21d) in each of FIGS. 21a-c. The viewing freedom for each eye was also determined, both by calculation and by measurement: pattern 2122a represents the maximum right eye viewing lobe as calculated, and pattern 2122b represents the right eye viewing lobe as measured; pattern 2124a represents the maximum left eye viewing lobe as calculated, and pattern 2124b represents the left eye viewing lobe as measured.

The viewing freedom plots of FIGS. 21a-c show similar performance for each of the 3D light redirecting films based on the conoscope measurements across the respective stereoscopic backlights made with the described 3D films. The films can be seen to provide similar performance, and in each case the calculated viewing lobe for the left and right eyes nearly completely overlap the corresponding maximum viewing lobes. If the performance of the second and third 3D films had been deficient due to the presence of the planarizing nanovoided layer, the measured viewing lobes would have been substantially smaller than the maximum viewing lobes.

Figure 22:
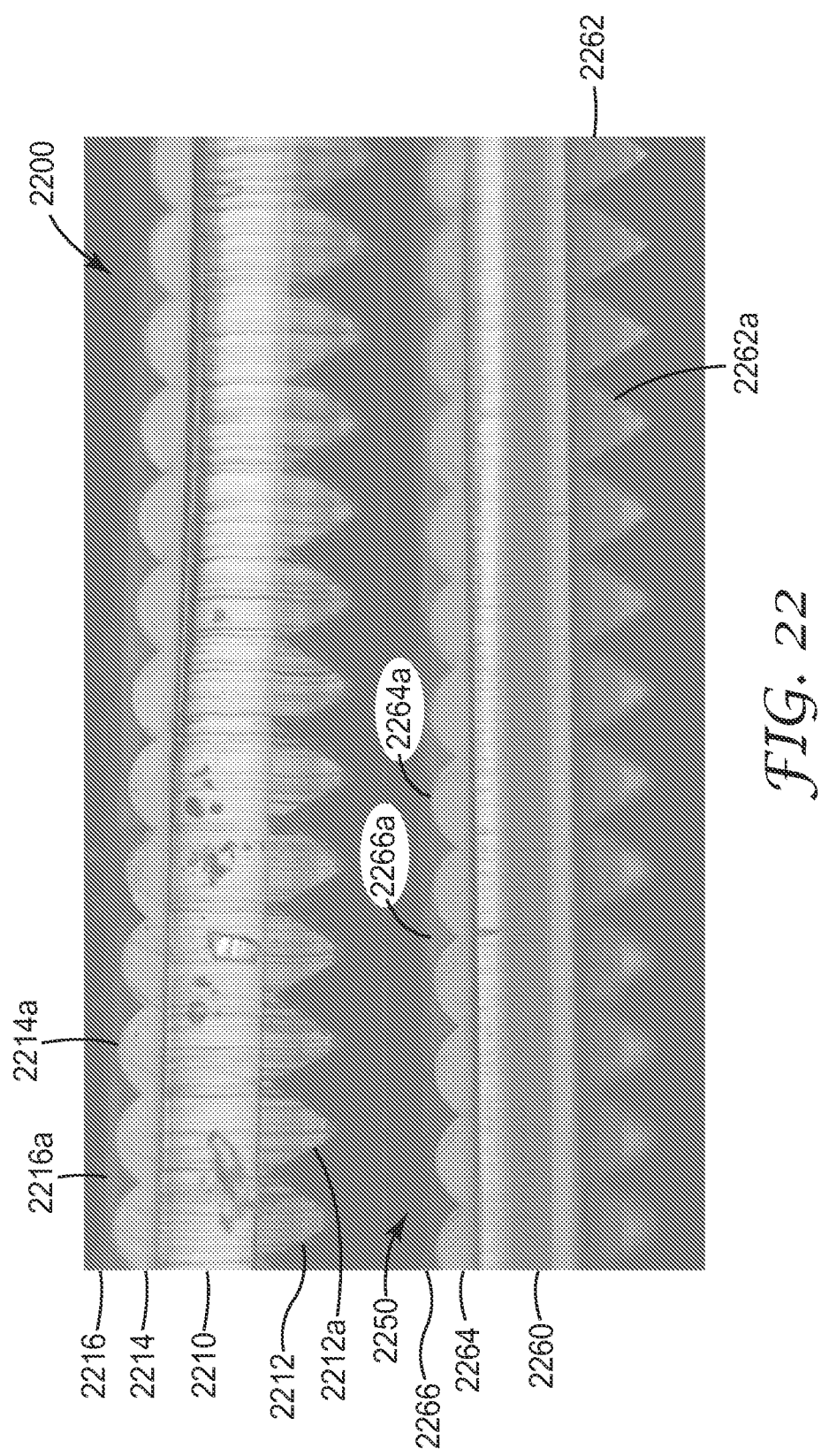
FIG. 22 is a photomicrograph of two different light redirection films whose lenticular structured surfaces have been planarized with a layer of ultra low refractive index material.

FIG. 22 is a photomicrographic cross section of the fabricated second 3D light redirecting film 2200 and of the third 3D light redirecting film 2250 described above. The film 2200 includes a PET carrier film or substrate 2210, to which has been applied a first polymer layer 2212 having a prismatic structured surface 2212a, and a second polymer layer 2214 having a lenticular structured surface 2214a. A layer 2216 of low refractive index nanovoided material planarizes the structured surface 2214a. The film 2250 includes a PET carrier film or substrate 2260, to which has been applied a first polymer layer 2262 having a prismatic structured surface 2262a, and a second polymer layer 2264 having a lenticular structured surface 2264a. A layer 2266 of low refractive index nanovoided material planarizes the structured surface 2264a. As described above, the lenticular elements of surfaces 2214a, 2264a have a variable curvature from the tops to the edges of each lenticular element, and the facets of prismatic structured surface 2262a are slightly curved rather than flat.

In addition to fabricating planarized 3D light redirecting films in which the upper lenticular structured surface was immersed in a nanovoided layer, we have also modeled the behavior of constructions involving a light redirecting film, lightguide, and back reflector, in which the lenticular structured surface of the light redirecting film (see e.g. structured surface 1714a in FIG. 17) was in all cases exposed to air, and various other structured surfaces in the construction—in particular, (1) the lenticular structured surface at the front of the light guide (see e.g. surface 1716a in FIG. 17), (2) the shallow prismatic structured surface at the back of the light guide (see e.g. surface 1724a in FIGS. 17), and (3) the prismatic structured surface at the back of the light redirecting film (see e.g. surface 1712a in FIG. 17)—were selectively provided with a planarized nanovoided low refractive index layer. This modeling was performed with the following assumptions: the dimensions of the lightguide were 72 mm by 48 mm (in-plane or transverse dimensions) by 0.8 mm (axial or thickness dimension); the lenticular and prismatic structured surfaces of the 3D light redirecting film were designed to provide a nominal viewing distance of 400 mm. For the modeling, light is launched into the lightguide, and the light observed at a point 400 mm from the display is computed, and the crosstalk of the system is calculated. This modeling is done for eight different embodiments, corresponding to the following conditions:

(1) where the lenticular structured surface at the front of the light guide (see e.g. surface 1716a in FIG. 17) is either exposed to air or planarized with a nanovoided ultra low index (ULI) material;

(2) where the space (see e.g. layer 1726) between the shallow prismatic structured surface at the back of the light guide (see e.g. surface 1724a in FIG. 17) and the back reflector (see e.g. layer 1728 in FIG. 17) is either air-filled or filled with the nanovoided ULI material;

(3) where the prismatic structured surface at the back of the light redirecting film (see e.g. surface 1712a in FIG. 17) is either exposed to air or planarized with the nanovoided ULI material.

We designate a given permutation with a three-letter code, where "a" refers to air and "u" refers to the nanovoided ULI material. For example, "aau" means that condition (1) above uses air, condition (2) above also uses air, and condition (3) uses ULI. In another example, "uaa" means that condition (1) above uses the nanovoided ULI, condition (2) above also uses air, and condition (3) uses air. Note that if the first letter of the code is "a" but the last letter of the code is "u", it means that a planarizing layer of ULI is provided on the back prismatic structured surface of the light redirecting film, but this planarizing layer only extends half way to the top of the light guide, which is exposed to air. Likewise, if the first letter of the code is "u" but the last letter is "a", it means that a non-planarizing layer of ULI is provided on the front lenticular structured surface of the light guide, but it only extends half way to the bottom of the light redirecting film, such that the prismatic structured surface at the bottom of the light redirecting film remains exposed to air.

The modeling assumed the nanovoided ULI material, if present, had a refractive index of 1.2. The modeling also assumed the light guide had the following parameters: index of refraction of 1.5, shallow prism included angle of 172 degrees and shallow prism pitch of 0.408 mm. The model also assumed that the 3D film had the follow parameters: index of refraction of 1.5, prism included angle of 60 degrees, prism pitch of 0.2600407 mm, lenticular radius of curvature of 0.1815 mm, lenticular pitch of 0.260 mm and an overall thickness of 0.506 mm. The model also assumed a specular mirror reflectivity of 98.5%. The modeling also assumed the same structured surface geometries for all permutations. That is, the positions, angles, curvatures, etc. of the structured surfaces of the light redirecting film and of the light guide were not changed from one permutation to the next.

Figure 23:
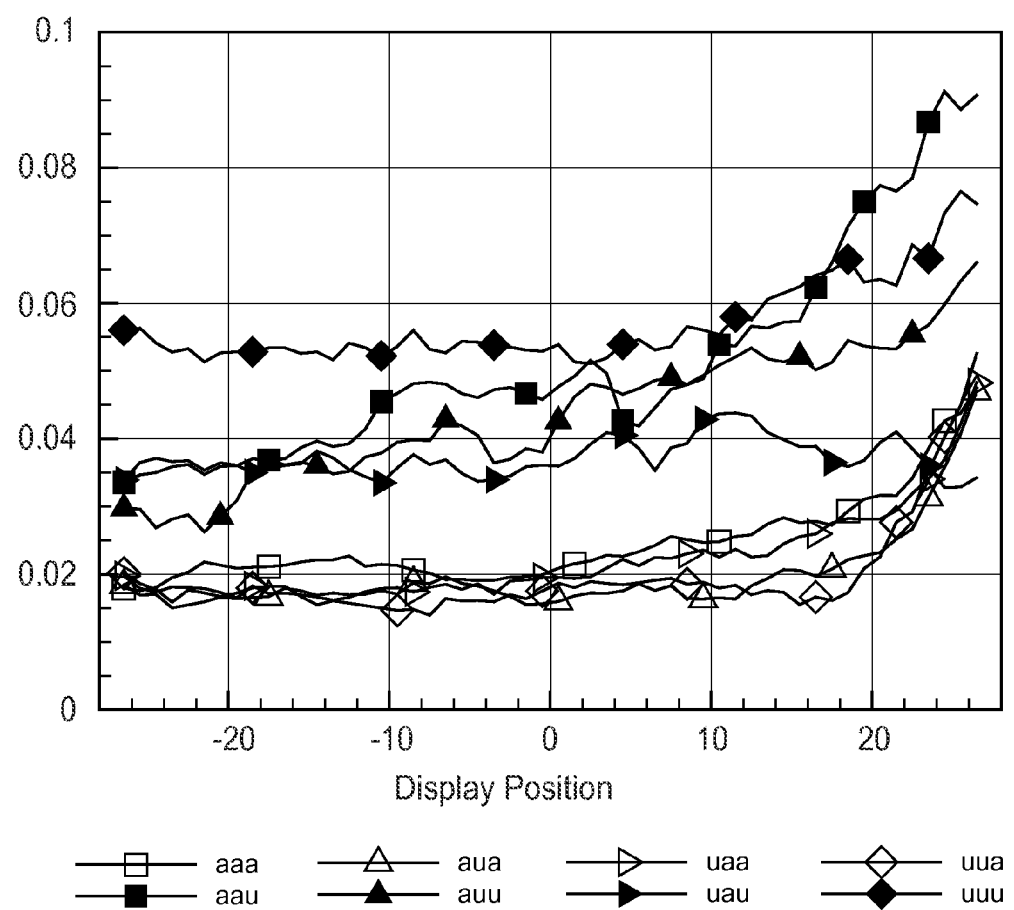
FIG. 23 is a graph of crosstalk for various modeled autostereoscopic displays, including some displays in which the light redirecting film is attached to the light guide with a layer of ultra low index nanovoided material.

The eight permutations were modeled and the crosstalk, i.e., the amount of light entering the "wrong" eye of the observer, was calculated as a function of display position, i.e. the position along a transverse axis of the display viewing area. The viewing area of the display is smaller than that of the light guide to allow for adequate mixing. The actual viewing area modeled was 54 mm×41 mm. The results are shown in FIG. 23, where each curve is associated with a given permutation code. The plotted curves confirm, among other things, that useful embodiments can be constructed in which the space between the prismatic structured surface (at the back of the 3D light redirecting film) and the lenticular structured surface (at the front of the light guide) is completely filled with a nanovoided layer of ultra low refractive index material.

The reader will understand that "top", "bottom", "cover", "substrate", "carry", and "atop" should not be construed for purposes of this application to require any particular orientation with respect to gravity, unless otherwise clearly indicated to the contrary.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A light redirecting film, comprising:
a first major surface that is microstructured to form lenticular features; and
a second major surface that is microstructured to form prismatic features;
wherein the first major surface is a first interface between a first high refractive index layer and a first low refractive index layer;
wherein the first low refractive index layer has a first nanovoided morphology and comprises a first polymer binder;
wherein the second major surface is a second interface between a second high refractive index layer and a second low refractive index layer; and
wherein the second low refractive index layer has a second nanovoided morphology and comprises a second polymer binder.

2. The film of claim 1, wherein the first low refractive index layer also comprises a first plurality of particles.

3. The film of claim 1, wherein the first low refractive index layer has a refractive index of 1.3 or less at a visible wavelength.

4. The film of claim 1, wherein the first high refractive index layer has a refractive index of at least 1.4 at a visible wavelength.

5. The film of claim 1, further comprising:
a second high refractive index layer;
wherein the second high refractive index layer is disposed between the first and second major surfaces.

6. The film of claim 5, wherein the second high refractive index layer comprises a support film.

7. The film of claim 1, wherein the film contains no layer between the first and second major surfaces that comprises a support film.

8. The film of claim 1, wherein each of the lenticular features includes a curved surface that is curved towards the second major surface.

9. The film of claim 1, wherein each of the lenticular features includes a curved surface that is curved away from the second major surface.

10. The film of claim 1 in combination with a stiff support, the film being attached to the stiff support with no intervening air gap.

11. The combination of claim 10, wherein the stiff support comprises a light transmissive plate.

12. The film of claim 1, wherein the first high refractive index layer is disposed between the first major surface and the second major surface.

13. The film of claim 1, wherein the first low refractive index layer is disposed between the first major surface and the second major surface.

14. The film of claim 1, in combination with a display panel, the film being attached to the display panel with no intervening air gap.

15. The film of claim 1, wherein the second major surface is exposed to air.

16. The film of claim 1 in combination with a light guide, the film being attached to the light guide with no intervening air gap.

17. The combination of claim 16, further in combination with a display panel, the film being attached to the display panel with no intervening air gap.

18. The film of claim 1, wherein the second major surface is the first interface.

19. The film of claim 18, wherein the first high refractive index layer is disposed between the first major surface and the second major surface.

20. The film of claim 18, wherein the first low refractive index layer is disposed between the first major surface and the second major surface.

21. The film of claim 18 in combination with a light guide, the film being attached to the light guide with no intervening air gap.

22. The film of claim 18, wherein the first major surface is exposed to air.

23. The film of claim 1, further comprising a first adhesive layer and a first release liner disposed on a first side of the film.

* * * * *